(12) United States Patent
Takama

(10) Patent No.: US 11,935,182 B2
(45) Date of Patent: Mar. 19, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yasufumi Takama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/951,245

(22) Filed: Sep. 23, 2022

(65) Prior Publication Data

US 2023/0098633 A1 Mar. 30, 2023

(30) Foreign Application Priority Data

Sep. 30, 2021 (JP) .................................. 2021-161966

(51) Int. Cl.
*G06T 15/20* (2011.01)
*G06T 7/00* (2017.01)
*G06T 7/571* (2017.01)
*G06T 15/04* (2011.01)

(52) U.S. Cl.
CPC .......... *G06T 15/205* (2013.01); *G06T 7/0002* (2013.01); *G06T 7/571* (2017.01); *G06T 15/04* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 11,189,041 B2 | 11/2021 | Takama | |
| 2009/0116732 A1* | 5/2009 | Zhou | H04N 13/261 348/42 |
| 2013/0222368 A1 | 8/2013 | Takama et al. | |
| 2021/0029338 A1* | 1/2021 | Taya | H04N 23/80 |
| 2022/0044477 A1 | 2/2022 | Takama et al. | |

FOREIGN PATENT DOCUMENTS

| JP | 2019-121945 A | 7/2019 |
|---|---|---|
| JP | 2021-022032 A | 2/2021 |

OTHER PUBLICATIONS

Extended European Search Report issued in corresponding EP Patent Application No. 22195776.4, dated Jan. 30, 2023, pp. 1-11.

* cited by examiner

*Primary Examiner* — Stephen T. Reed
(74) *Attorney, Agent, or Firm* — Carter, DeLuca & Farrell LLP

(57) ABSTRACT

An information processing apparatus performs first determination of determining whether a blurring state of a region in a captured image corresponding to an element of three-dimensional shape data of an object satisfies a condition and performs second determination of, in a case where the blurring state is determined to satisfy the condition, determining whether the region is visible or invisible from an image capture apparatus having captured the captured image and, in a case where the blurring state is determined not to satisfy the condition, determining that the region is invisible. The information processing apparatus generates information used in generating a virtual viewpoint image, based on a determination result by the second determination.

8 Claims, 14 Drawing Sheets

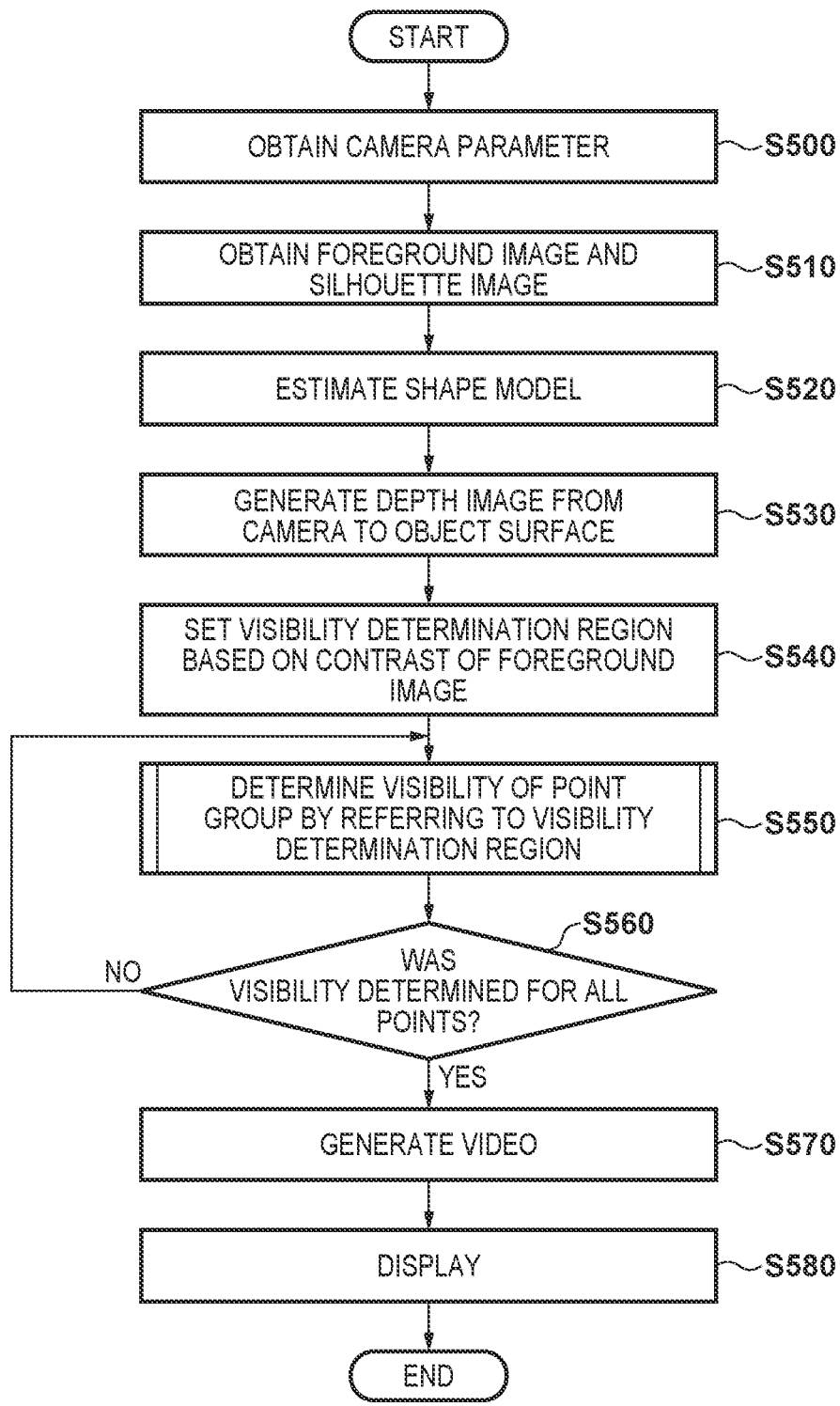

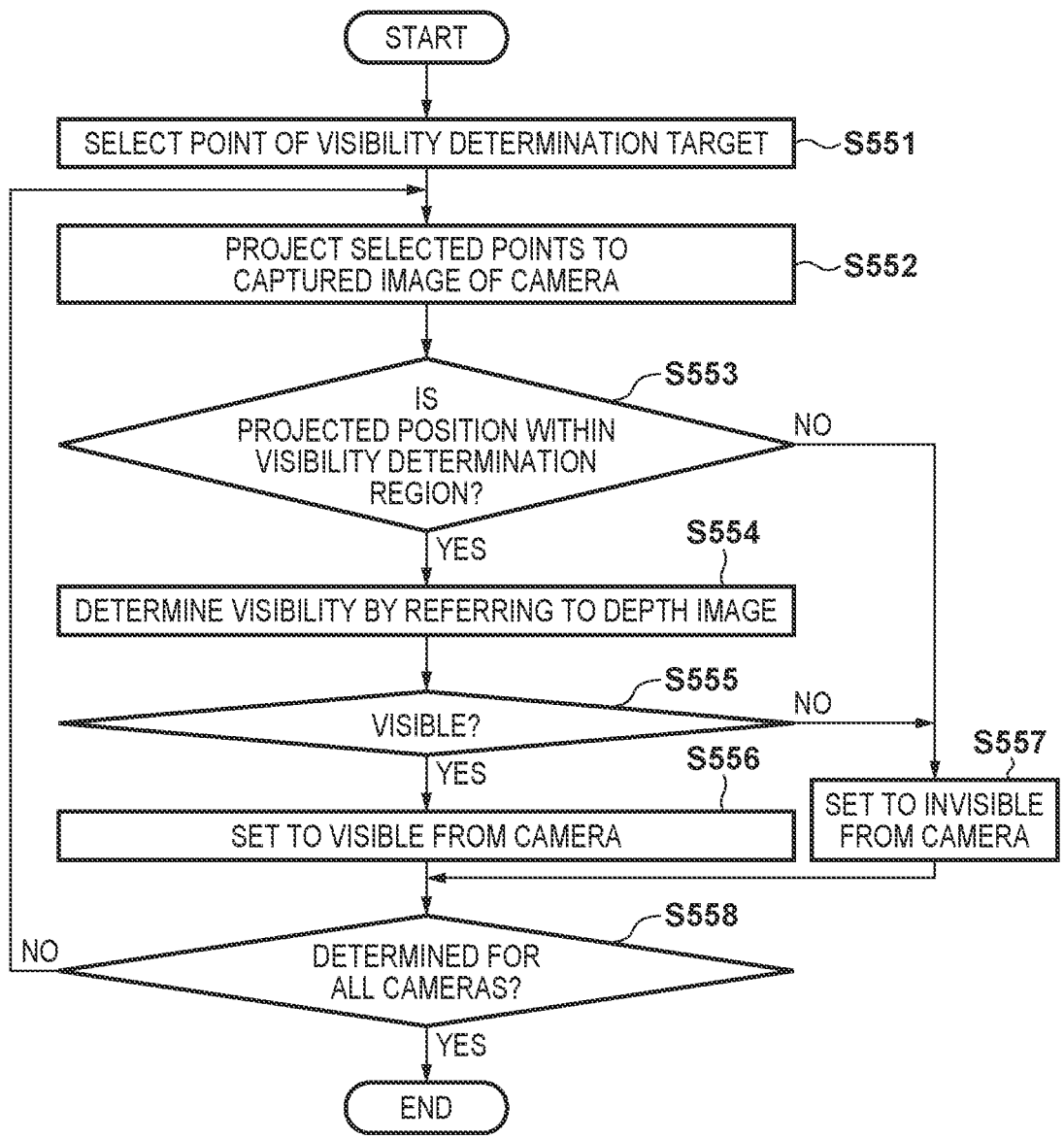

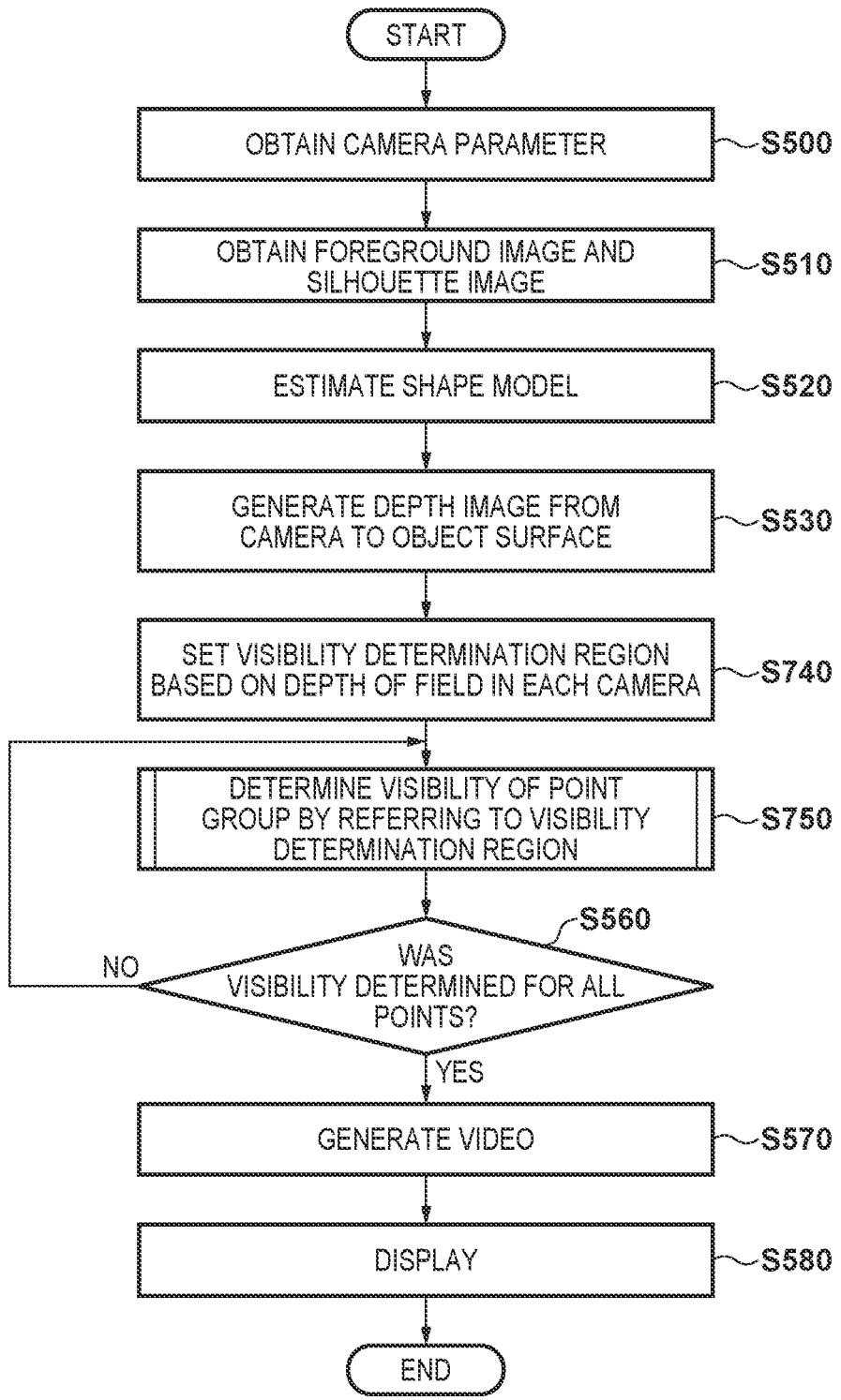

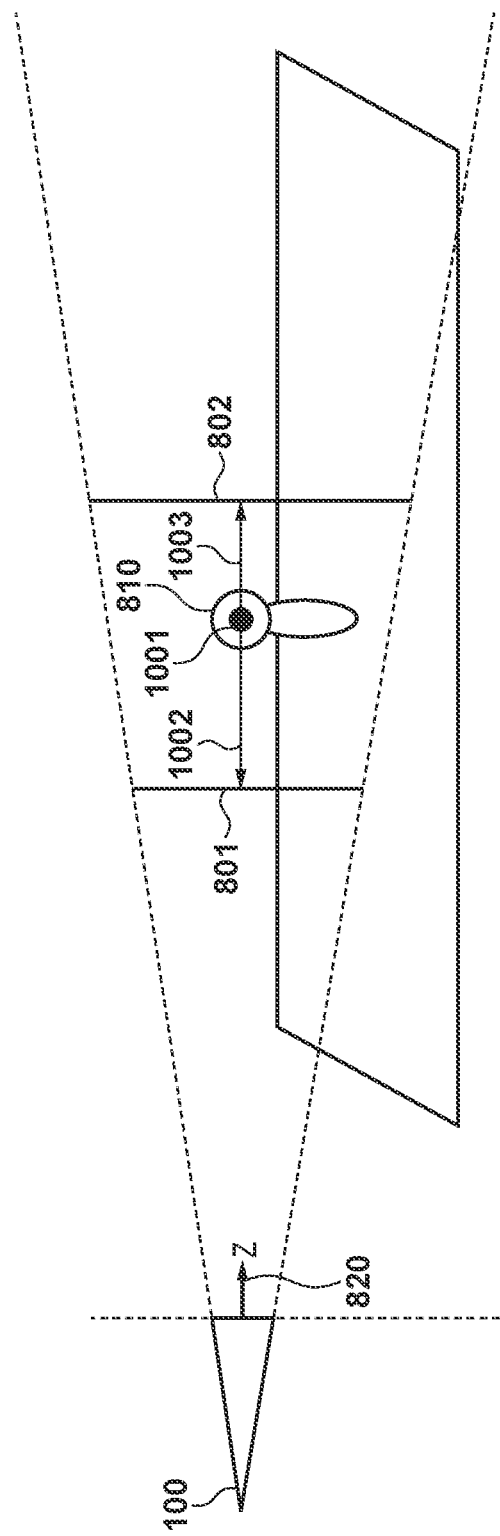

INFORMATION PROCESSING APPARATUS, INFORMATION PROCESSING METHOD, AND STORAGE MEDIUM

BACKGROUND

Field

The present disclosure pertains to an information processing apparatus, an information processing method, and a storage medium that generate virtual viewpoint video by using images of an object captured in a plurality of directions.

Description of the Related Art

Technology of generating, in real time, an image observed from a virtual viewpoint (referred to below as a virtual viewpoint image) by using captured images of an object captured in different directions by a plurality of cameras has been attracting attention. A virtual viewpoint is information such as a position and a sight-line direction of a camera set in a virtual space. A camera set in a virtual space is referred to below as a virtual camera, and a camera placed in the real world is purely referred to below as a camera. To generate a virtual viewpoint image, a captured image of an object, a shape model representing a three-dimensional shape of an object, and visibility information are required. The shape model expresses a three-dimensional shape of an object by, for instance, a mesh or a point group. The mesh includes a triangle or a rectangle as an element, and the point group includes a point as an element. The visibility information is information indicating whether each element of the shape model is visible from each of a plurality of cameras. Here, "visible from a camera" implies that an element falls within an angle of view of the camera and is not hidden by other elements. A virtual viewpoint image is generated by obtaining color from cameras from which respective elements of the shape model are determined to be visible, and combining the color. For instance, in Japanese Patent Laid-Open No. 2021-022032, whether each vertex of a face of a mesh model is visible from a camera is evaluated, and in a case where all of the vertices are visible, that face is determined to be visible from the camera. Then, color information is obtained from a captured image by the camera from which the face is determined to be visible, and a virtual viewpoint image is generated.

When a virtual viewpoint image is generated, focus of a camera is adjusted with respect to a target object disposed in a capture area before image capturing. On this occasion, a depth of field of a camera taking an image of an object at high resolution is shallow, and as an object separates from a focal point, blurring becomes larger. On the other hand, a depth of field of a camera having normal resolution is deep, and there is less blurring in an entire captured image. When a virtual viewpoint image is generated by using captured images obtained from a plurality of image capture apparatuses in which cameras having different depths of field coexist in this way, color of an image having a shallow depth of field and having large blurring is combined, and thus blurring of the virtual viewpoint image also becomes large, and there is a possibility that image quality will deteriorate.

SUMMARY

The present disclosure provides technology that can reduce deterioration of image quality of a virtual viewpoint image.

According to one aspect of the present disclosure, there is provided an information processing apparatus performs first determination of determining whether a blurring state of a region in a captured image corresponding to an element forming three-dimensional shape data of an object, generated based on a plurality of captured images captured by a plurality of image capture apparatuses satisfies a condition; performs second determination of, in a case where the blurring state is determined to satisfy the condition, determining whether a part in the object corresponding to the element is captured by an image capture apparatus, and in a case where the blurring state is determined not to satisfy the condition, determining that the part in the object corresponding to the element is not captured, and generates information used in generating a virtual viewpoint image, based on a determination result by the second determination.

Further features of the present disclosure will become apparent from the following description of exemplary embodiments with reference to the attached drawings.

BRIEF DESCRIPTION OF THE DRAWINGS

FIG. 5A is a flowchart illustrating virtual viewpoint image generation processing according to the first embodiment.

FIG. 5B is a flowchart illustrating virtual viewpoint image generation processing according to the first embodiment.

FIG. 7A is a flowchart illustrating virtual viewpoint image generation processing according to a second embodiment.

FIG. 10 is a schematic diagram explaining a visibility determination region related to the third embodiment.

DESCRIPTION OF THE EMBODIMENTS

Figure 1:
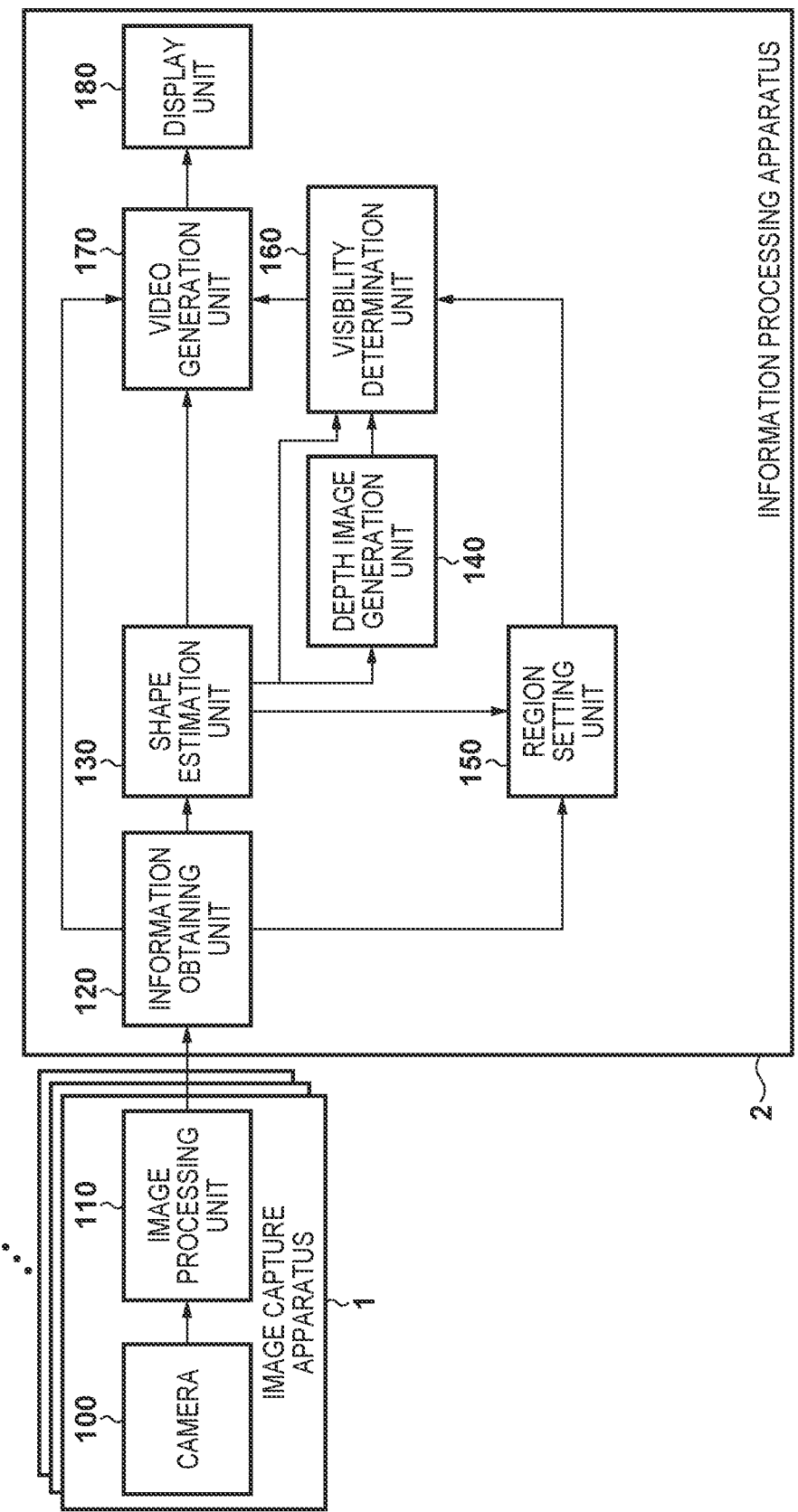
FIG. 1 is a figure illustrating a configuration example of a virtual-viewpoint image generating system according to a first embodiment.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment

A first embodiment will describe a method including setting, on a captured image of each camera, a region for visibility determination, and determining visibility, based on that region, to reduce blurring in a virtual viewpoint image.

Configuration of System

A virtual-viewpoint image generating system related to the first embodiment will be explained with reference to the drawings. FIG. 1 is a block diagram illustrating a functional configuration example of a virtual-viewpoint image generating system, and of an image capture apparatus 1 and an information processing apparatus 2 that the system includes, according to the first embodiment. A plurality of the image capture apparatuses 1 are connected to the information processing apparatus 2.

The image capture apparatuses 1 each include a camera 100 that captures an image of an object, and an image processing unit 110 that processes a captured image of the camera 100. The plurality of image capture apparatuses 1 (a plurality of the cameras 100) capture images of an object in a plurality of different directions. The plurality of cameras 100 are installed at different positions and in different directions, respectively, to surround an object, and capture images in synchronization. The camera 100 that the image capture apparatus 1 includes has an identification number for identifying the camera. Note that the cameras 100 may not be installed in entire circumference of an object, and may be installed only in some of directions with respect to an object, depending on a limitation of an installation location or the like. Furthermore, the number of the cameras 100 is determined in accordance with an image sensing target, an image capturing environment and the like, and is not limited to a particular number. For instance, in a case where soccer or rugby images are captured, several tens to hundreds of cameras may be installed around a stadium. The plurality of cameras 100 may include cameras having different angles of view, such as a telephoto camera and a wide-angle camera. Furthermore, the plurality of camera 100 are synchronized by a single piece of time information of the real world, and capture images simultaneously. Image capturing time information is applied to each frame (image) of video obtained.

The image processing unit 110 generates a foreground image from a captured image by the camera 100. The foreground image refers to an image generated by extracting an object region (foreground region) from a captured image. An object extracted as the foreground region generally refers to a moving object (moving body) that has movement (a position or a shape of the moving object may change) in a case where images are captured in an equal direction in time series. In a game, examples of the moving object include a person such as a player or a referee present in a field where the game is played, a ball in addition to a person in a case of a ball game, and the like. Furthermore, in a concert or an entertainment, the moving object is a singer, an instrumentalist, a performer, a presenter, or the like. Note that the present embodiment explains the image capture apparatus 1 including one camera 100 and one image processing unit 110, that is, one camera 100 provided with one image processing unit 110, but a plurality of cameras may be connected to one image processing unit 110.

Furthermore, the image processing unit 110 holds state information such as a position and an attitude (orientation, image capturing direction), a focal length, an optical center (image center), distortion, and an F number of the camera 100. Control of a position and an attitude (orientation, image capturing direction) of the camera 100 may be implemented by the image processing unit 110 controlling a pan head (not illustrated) on which the camera 100 is mounted. A state of the camera 100 will be explained as a camera parameter below, but that parameter may include a parameter controlled by another apparatus such as a pan head. Note that a camera parameter pertaining to a position and an attitude (orientation, image capturing direction) of the camera 100 is a so-called extrinsic parameter. Furthermore, a parameter pertaining to a focal length, an optical center (image center), distortion, and an F number of the camera 100 is a so-called intrinsic parameter. Further, the image processing unit 110 further includes means of detecting abnormality of the camera 100, and transmits abnormality information indicating presence or absence of abnormality of the camera 100 to the information processing apparatus 2. Abnormality of the camera 100 can be detected by evaluating a general sensor value such as heat and vibration, for instance.

Figure 2A:
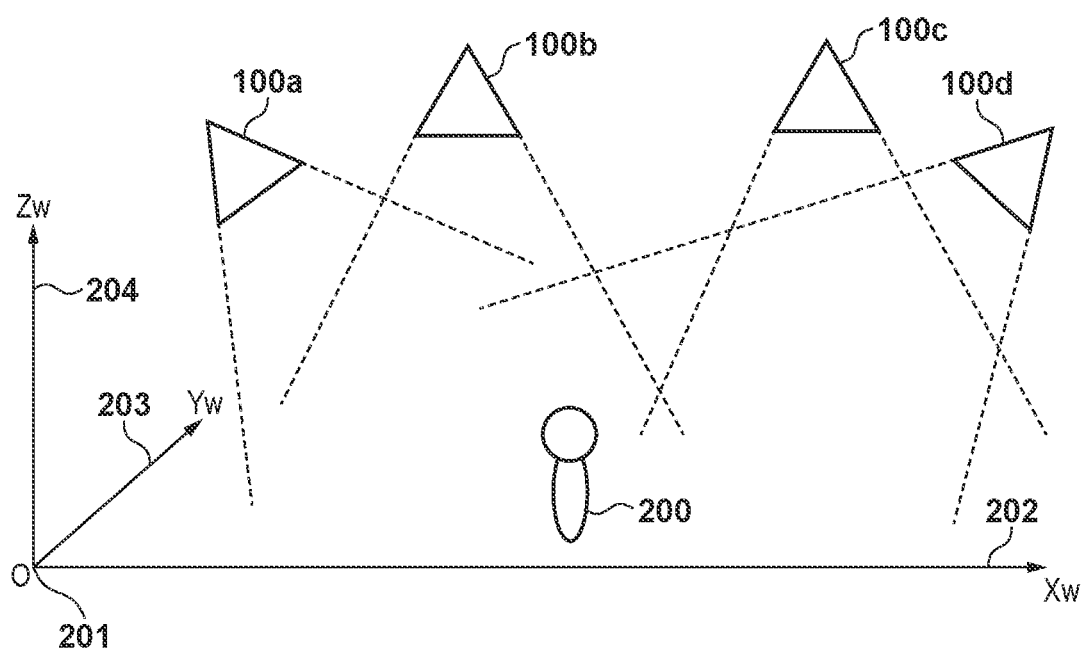
FIGS. 2A and 2B are schematic diagrams each explaining a coordinate system of a camera parameter of the first embodiment.
Figure 2B:
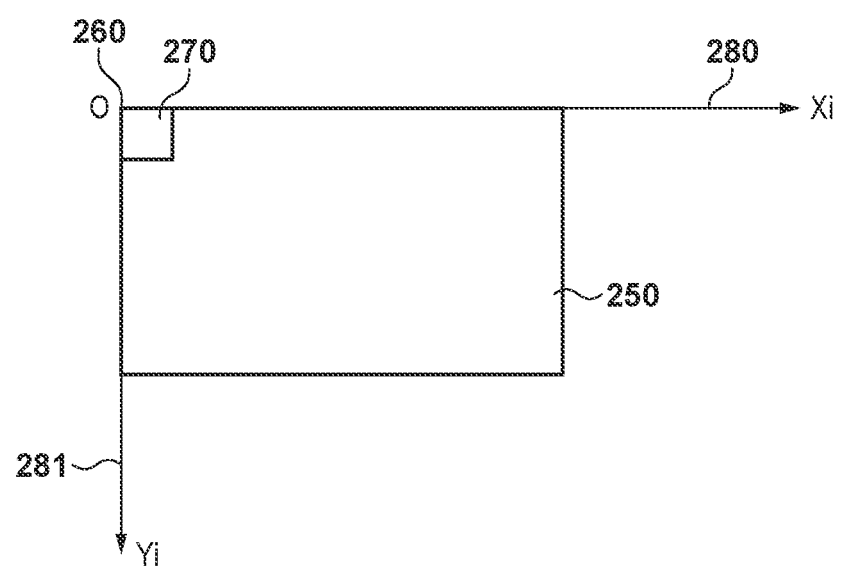

Here, a coordinate system will be explained with reference to FIGS. 2A and 2B. In FIG. 2A, cameras 100a to 100d that capture images of an object 200 are disposed in a three-dimensional space. Positions and attitudes of the cameras 100a to 100d are expressed by a single world coordinate system expressed by an origin 201, an Xw axis 202, a Yw axis 203, and a Zw axis 204. Furthermore, FIG. 2B illustrates a camera image coordinate system (referred to below as an image coordinate system) in a captured image 250 by the camera 100a. In the image coordinate system, as illustrated in FIG. 2B, an origin 260, an Xi axis 280, and a Yi axis 281 are set, and a pixel at coordinates (0,0) is referred to as a pixel 270. Note that image coordinate systems of the other cameras 100b to 100d are also similarly defined.

Referring again to FIG. 1, the functional configuration of the information processing apparatus 2 will be explained. The information processing apparatus 2 includes an information obtaining unit 120, a shape estimation unit 130, a depth image generation unit 140, a region setting unit 150, a visibility determination unit 160, a video generation unit 170, and a display unit 180. Note that the display unit 180 may be provided as an external apparatus of the information processing apparatus 2, and may be a display apparatus connected to the information processing apparatus 2.

The information obtaining unit 120 obtains a captured image captured by the camera 100 from the image capture apparatus 1, a foreground image extracted from the captured image, and a camera parameter. Note that the information obtaining unit 120 may calculate a camera parameter. In this case, for instance, the information obtaining unit 120 extracts a feature point from a marker image (for instance, a checker board) for camera calibration captured in advance by the camera 100. Then, the information obtaining unit 120 calculates a camera parameter by calibrating each camera to minimize an error generated when the feature point extracted is projected onto a captured image of each camera. Here, any existing method may be used as a method of calibrating a camera. Note that a camera parameter may be obtained in synchronization with a captured image, or may be obtained at a pre-preparation stage, or may be obtained as appropriate asynchronously with respect to a captured image. Further, the information obtaining unit 120 obtains abnormality information of the camera 100 from the image capture apparatus 1 (image processing unit 110).

The shape estimation unit 130 estimates a three-dimensional shape of an object, based on a silhouette image obtained from a foreground image and based on a camera parameter, and generates shape information representing the three-dimensional shape estimated. The shape estimation unit 130 performs control not to use, in shape estimation, a camera of which abnormality is notified by the abnormality information among the plurality of cameras. As an example of the shape information, in explanation described below, a shape model (three-dimensional shape data) formed by a set of point elements having three-dimensional coordinates (referred to below as a point group) is used. Note that the shape model is not limited to the point group, and may be, for instance, a mesh model including polygons such as a triangle or a rectangle as an element.

The depth image generation unit 140 generates, by using the shape model generated and the camera parameter generated, a depth image indicating a distance from the camera 100 to a surface of the shape model of the object. The shortest distance from the camera 100 to the surface of the shape model is stored in each pixel of the depth image. The depth image generation unit 140 provides the depth image generated to the visibility determination unit 160.

The region setting unit 150 sets a visibility determination region used to determine whether the visibility determination unit 160 executes visibility determination for each point of the shape model. In the present embodiment, the visibility determination region is set on a captured image by the camera 1M. As for a point of the shape model projected outside the visibility determination region set on the captured image of the camera 100, the visibility determination unit 160 does not execute determination of whether that point is visible from the camera 100, and invariably sets the point to be invisible. On the other hand, as for a point of the shape model projected inside the visibility determination region on the captured image of the camera 100, the visibility determination unit 160 determines whether that point is visible from the camera 100 (visibility).

Figure 3:
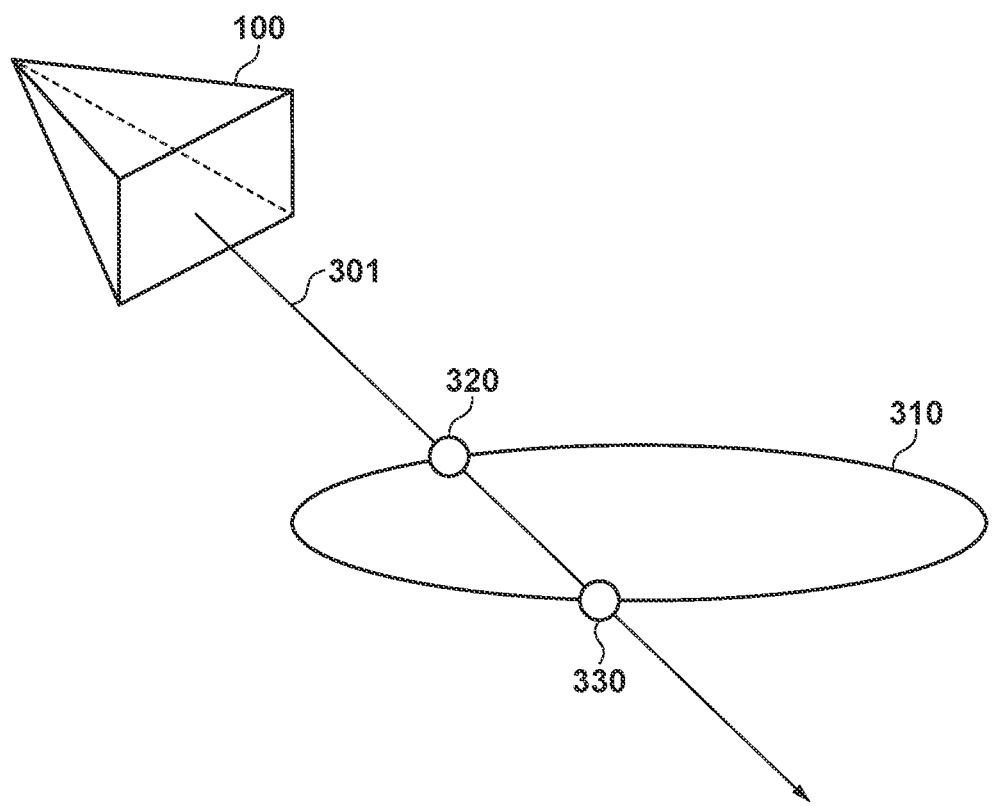
FIG. 3 is a schematic diagram explaining visibility related to the first embodiment.

The visibility determination unit 160 determines visibility for each point of the shape model. The visibility refers to information indicating whether each point of the shape model is visible from each camera. Visibility determination will be explained with reference to a schematic diagram of FIG. 3. The camera 100 is oriented in a direction 301. A surface 310 of an object includes a point 320 and a point 330 that are portions of a point group of a shape model. In a case where the point 320 and the point 330 are located on extension of the direction 301 as illustrated, the visibility determination unit 160 determines that the point 320 located by a shorter distance from the camera 100 is visible from the camera 100. On the other hand, as for the point 330 located by a longer distance from the camera 100 than the point 320 and hidden by the point 320, the visibility determination unit 160 determines that the point 330 is invisible from the camera 100. When the visibility determination unit 160 determines whether each point of the point group is visible from the camera 100, the visibility determination unit 160 determines based on the visibility determination region whether visibility is determined, and performs visibility determination only as for a point determined to be a visibility determination target. A point determined not to be a visibility determination target is immediately determined to be invisible.

The video generation unit 170 generates video in which a virtual viewpoint image is a frame. The video generation unit 170 receives designation of a virtual viewpoint (a camera parameter of a virtual camera) and generates a virtual viewpoint image in accordance with the virtual viewpoint designated. The virtual viewpoint is designated by a user (operator) via, for instance, an operation unit 416 (described below with reference to FIG. 4) that the information processing apparatus 2 includes. The operation unit 416 may be constituted by, for instance, at least one of a joy stick, a jog dial, a touch panel, a keyboard, a mouse, and the like. Note that a virtual viewpoint designation method is not limited to this. For instance, a parameter file of a virtual camera in which a position and a sight-line direction of each of virtual viewpoints arranged in time series are recorded may be used. In this case, the information processing apparatus 2 (video generation unit 170) reads this parameter file when generating a virtual viewpoint image, and sets a virtual viewpoint, based on description of the parameter file. For instance, the display unit 180 causes a display 415 (FIG. 4) to display video (virtual viewpoint image) generated by the video generation unit 170.

Figure 4:
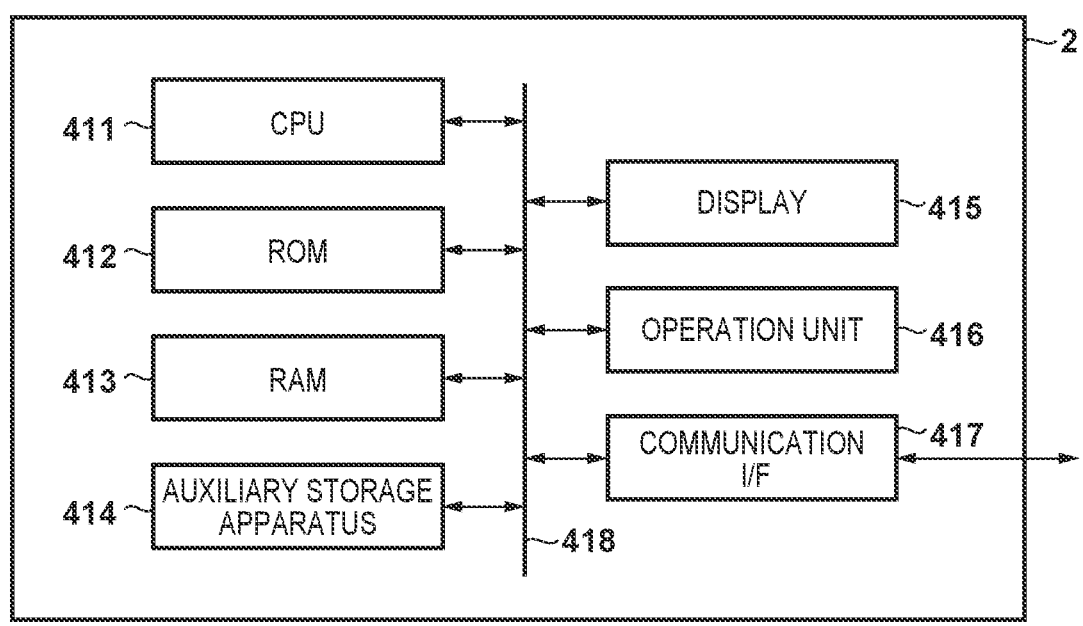
FIG. 4 is a block diagram illustrating a hardware configuration example of an information processing apparatus of the first embodiment.

A hardware configuration of the information processing apparatus 2 will be explained with reference to FIG. 4. The information processing apparatus 2 includes a CPU 411, a ROM 412, a RAM 413, an auxiliary storage apparatus 414, the display 415, the operation unit 416, a communication I/F 417, and a bus 418. The CPU 411 implements each function of the information processing apparatus 2 illustrated in FIG. 1 by controlling entirely the information processing apparatus 2 by using a computer program or data stored in the ROM 412 or the RAM 413. Note that the information processing apparatus 2 includes one or more pieces of dedicated hardware different from the CPU 411, and the dedicated hardware may execute at least a portion of processing to be executed by the CPU 411. Examples of the dedicated hardware include an application specific integrated circuit (ASIC), a field programmable gate array (FPGA), and a digital signal processor (DSP). The ROM 412 stores a program or the like that is not required to be changed. The RAM 413 temporarily stores a program or data supplied from the auxiliary storage apparatus 414, and data or the like externally supplied via the communication I/F 417. The auxiliary storage apparatus 414 is constituted by, for instance, a hard disk drive or the like, and stores a variety of data such as image data and audio data.

The display 415 is constituted by, for instance, a liquid crystal display, an LED, or the like, and displays a graphical user interface (GUI) or the like for a user to operate the information processing apparatus 2. The operation unit 416 is constituted by, for instance, a keyboard or a mouse, a joy stick, a touch panel, or the like, and inputs various instructions to the CPU 411 when receiving a user operation. The CPU 411 operates as a display control unit (display unit 180) that controls the display 415, and as an operation control unit that controls the operation unit 416.

The communication I/F 417 is used for communication with an apparatus external to the information processing apparatus 2. For instance, in a case where the information processing apparatus 2 is in wired connection with an external apparatus, a cable for communication is connected to the communication I/F 417.

In a case where the information processing apparatus 2 has a function to wirelessly communicate with an external apparatus, the communication I/F 417 includes an antenna. The bus 418 connects the respective units of the information processing apparatus 2, and transmits information between the respective units of the information processing apparatus 2.

Note that in the present embodiment, the display 415 and the operation unit 416 are internally present in the information processing apparatus 2, but at least one of the display 415 and the operation unit 416 may be present externally to the information processing apparatus 2 as another apparatus.

Operation Flow

With reference to flowcharts illustrated in FIGS. 5A and 5B, virtual viewpoint image generation processing performed by the information processing apparatus 2 will be explained.

At S500, the information obtaining unit 120 obtains a camera parameter of the camera 100 from the image capture apparatus 1. As described above, the information obtaining unit 120 may calculate and obtain the camera parameter. The camera parameter is not required to be obtained every time a captured image is obtained, and may be calculated at least once before shape estimation is executed. The camera parameter obtained is used by the shape estimation unit 130, the region setting unit 150, and the like.

At S510, the information obtaining unit 120 obtains a foreground image extracted by the image processing unit 110. As described above, the information obtaining unit 120 may generate the foreground image from a captured image of the camera 100. In this case, the information obtaining unit 120 obtains a captured image by the camera 100 from the image capture apparatus 1. The foreground image may be generated by using a general technique such as a background difference method of calculating, from a captured image of an object, a difference between a foreground image and a background image captured in advance when no object is present, such as before a start of a game. However, the method of generating the foreground image is not limited to this. For instance, the foreground image may be generated by extracting a region of an object by using a method such as object (human body) recognition. Furthermore, the information obtaining unit 120 generates a silhouette image of an object. The silhouette image is generated by deleting texture information from the foreground image obtained. In the silhouette image, a pixel value of a region other than an object region is set to 0, and a pixel value of the object region is set to a value other than 0. Note that the information obtaining unit 120 may obtain the silhouette image from the image capture apparatus 1. In this case, a silhouette image of an object is generated by the image processing unit 110 of the image capture apparatus 1.

At S520, the shape estimation unit 130 estimates a shape of the object by using the silhouette image and the camera parameter that are obtained by the information obtaining unit 120, and generates a shape model. The shape model (point group information in the present example) generated by the shape estimation unit 130 is supplied to the depth image generation unit 140, the region setting unit 150, the video generation unit 170, and the like. Note that the shape estimation unit 130 of the present embodiment generates the shape model of the object by, for instance, a shape from silhouette method. As this processing result, point group information expressing the shape model of the object is obtained. Coordinates (Xw,Yw,Zw) of each point forming the shape model are expressed by, for instance, a coordinate system (world coordinate system) equal to a coordinate system of an extrinsic parameter of the camera 100. Further, the shape estimation unit 130 divides an obtained point group for each object by using a general three-dimensional labeling scheme based on presence or absence of a neighbor point, and obtains point group information for each object. An object ID that is a labeling result is applied to each point of the shape model. The point group information for each object can be obtained by designating this ID. Note that as the shape estimation method, a method other than the above-described method may be used.

At S530, the depth image generation unit 140 generates a depth image indicating a distance from the camera 100 to a surface of the object, based on the shape model (point group information) of the object generated by the shape estimation unit 130 and the camera parameter of the camera 100.

The generation of the depth image by the depth image generation unit 140 will be explained. The depth image has equal resolution, width, and height to those of the captured image. A value indicating the shortest distance from the camera 100 to the surface of the object is stored in each pixel of the depth image. To generate the depth image, the depth image generation unit 140 first multiples, by an external matrix Me, coordinates (Xw,Yw,Zw) according to the world coordinate system of a point P forming the shape model, and converts the coordinates of the point P into coordinates (Xc,Yc,Zc) of the camera coordinate system. Here, the external matrix Me is a matrix constituted by extrinsic parameters of the camera 100. When a positive direction of a z axis of the camera coordinate system is a direction in which a lens of the camera is oriented, a value of Zc in the coordinates (Xc,Yc,Zc) becomes a distance value from the camera 100 to the point P. The depth image generation unit 140 multiples, by an internal matrix Mi, normalized camera coordinates obtained by normalizing the coordinates (Xc,Yc,Zc) by Zc, and thus, calculates coordinates (Xi,Yi) in the image coordinate system of the point P. The coordinates (Xi,Yi) in the image coordinate system of the point P are coordinates (a pixel position in the depth image) that become a storage destination of a distance value (Zc). Here, Mi is a matrix constituted by intrinsic parameters of the camera 100. Note that in a case where a distance value of another point having already calculated is stored in the pixel of the coordinates (Xi,Yi), the depth image generation unit 140 compares the distance value stored and a value of Zc calculated this time. In a case where the value of Zc is smaller, the depth image generation unit 140 updates the pixel value of the coordinates (Xi,Yi) by the value of Zc. A depth image pertaining to one camera 100 (camera) can be generated by executing the above-described processing for all of points P. Depth images of all of the cameras are generated by performing the above-described processing for all of the cameras.

Figure 6A:
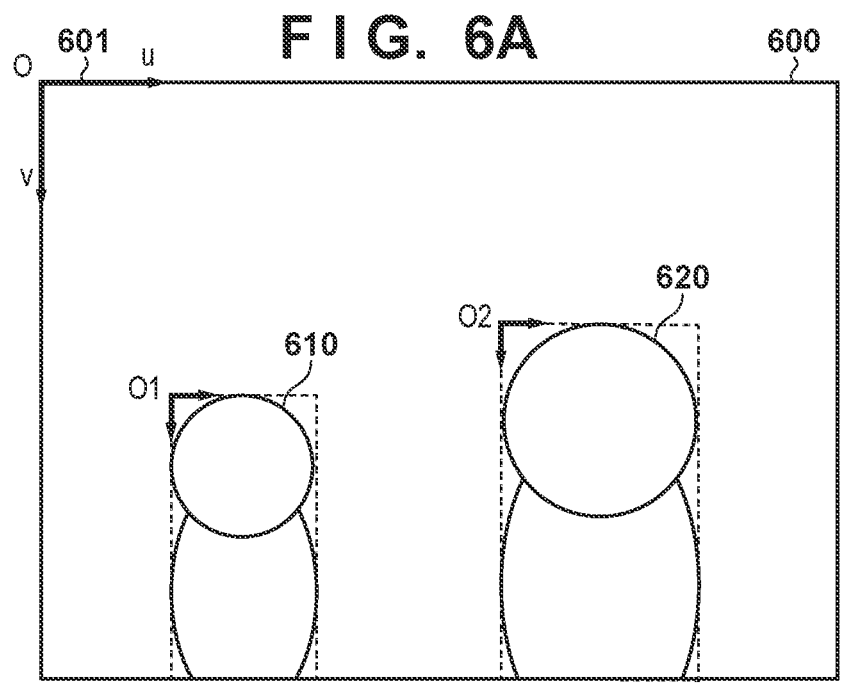
FIGS. 6A and 6B are schematic diagrams explaining a visibility determination region related to the first embodiment.
Figure 6B:
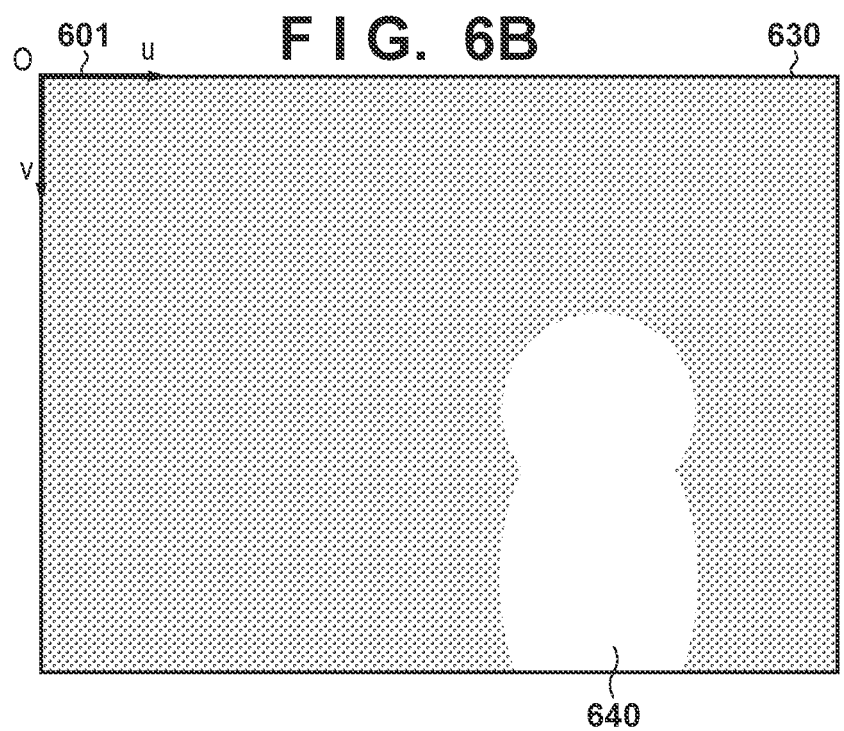

At S540, the region setting unit 150 obtains the foreground image of the camera 100 from the information obtaining unit 120, and sets a region (visibility determination region) in which visibility determination is executed by the visibility determination unit 160. In the present embodiment, a region in which a blurring state satisfies a predetermined condition in the captured image (a region in which a level of a blurring state is equal to or less than a predetermined level) is set to be the visibility determination region. That is, a region in which a focus state satisfies a predetermined condition in the captured image (a region in which a level of a focus state is equal to or greater than a predetermined level) is set to be the visibility determination region. A visibility determination region setting method according to the first embodiment will be explain with reference to FIGS. 6A and 6B. FIG. 6A is a schematic diagram of a captured image 600 in which a foreground image 610 and a foreground image 620 are captured. A coordinate system 601 of the captured image 600 includes a horizontal axis u, a vertical axis v, and an origin O. The foreground image 610 is a rectangular image containing an image of an object, and has coordinates (u,v) of a point O1 on the upper left of the rectangle, size information of the rectangle (the number of horizontal pixels and the number of vertical pixels), and pixel information within the rectangle. Similarly, the foreground image 620 has also coordinates (u,v) of a point O2 on the upper left of a rectangle containing an image of an object, size information (the number of horizontal pixels and the number of vertical pixels), and pixel information within the rectangle. FIG. 6B is a schematic diagram illustrating a state obtained after a visibility determination region is set. A visibility determination region 630 is expressed by an image having a size equal to that of the captured image 600, and each pixel has single-bit information. An initial value of each pixel of the visibility determination region 630 is set to 0 (indicating that the visibility determination region 630 is not a visibility determination target). A visibility determination region 640 is a region set to be a visibility determination target (region where a pixel value=1 is set) as a processing result of the foreground image 610 and the foreground image 620.

The region setting unit 150 first calculates contrast between the foreground image 610 and the foreground image 620 to set the visibility determination region. In the present embodiment, a change amount of luminance is used as the contrast. The region setting unit 150 converts each of the foreground image 610 and the foreground image 620 into a gray-scale image. The region setting unit 150 sequentially sets pixels in the foreground regions that are gray-scale-converted, to pixels of interest, and performs scanning as explained below. Whether a region is a foreground region can be determined by referring to the silhouette image. The region setting unit 150 sets a filter having a size of M×N to each of the pixels of interest, and searches for a minimum value Imin and a maximum value Imax in M×N nearby pixels with the pixel of interest being at the center. The region setting unit 150 calculates a contrast value of the pixel of interest by (Imax−Imin)/(Imax+Imin). When the contrast value calculated is equal to or greater than a threshold value set in advance, the region setting unit 150 determines that the pixel of interest is a pixel having high contrast and a less blur amount, and sets the pixel of the visibility determination region 630 corresponding to the pixel of interest to 1. Conversely, when the contrast value calculated is less than the threshold value, the region setting unit 150 determines that the pixel of interest is a pixel having low contrast and a large blur amount, and sets the pixel of the visibility determination region 630 corresponding to the pixel of interest to 0 (remains being the initial value). The visibility determination region 630 can be generated by calculating contrast values for all of the pixels in the foreground regions of the foreground images 610, 620 and setting the visibility determination region accordingly.

At S550, the visibility determination unit 160 obtains the camera parameter obtained by the information obtaining unit 120, the shape model (point group information) generated by the shape estimation unit 130, and the depth image generated by the depth image generation unit 140. Further, the visibility determination unit 160 obtains the visibility determination region set by the region setting unit 150. The visibility determination unit 160 determines visibility from the camera 100 of each point of the object, based on the camera parameter, the shape model, the depth image, and the visibility determination region that are obtained, and generates visibility information as a consequence. The processing at S500 to S540 described above is executed with respect to all of the plurality of cameras 100 (however, the camera of which abnormality is notified from the image capture apparatus 1 becomes out of a processing target).

FIG. 5B is a flowchart illustrating a detail of the processing at S550 of FIG. 5A. The processing of generating the visibility information (the method of determining visibility) executed by the visibility determination unit 160 will be explained below more in detail with reference to FIG. 5B. First, at S551, the visibility determination unit 160 selects a point P from the point group information of the object, as a visibility determination target. Then, at S552, the visibility determination unit 160 projects the point P selected onto the captured image of the camera 100. That is, the visibility determination unit 160 converts coordinates (Xx,Yw,Zw) of the point P represented by the world coordinate system into coordinates of the camera coordinate system and coordinates of the image coordinate system, and obtains camera coordinates (Xc,Yc,Zc) and image coordinates (Xi,Yi) of the point P. This coordinate conversion is similar to that used when the depth image is generated.

At S553, the visibility determination unit 160 determines whether a position of the point P projected is within the visibility determination region set at S540. More specifically, in a case where a pixel value of the visibility determination region corresponding to the image coordinates (Xi,Yi) of the point P is 1, that is, determined to be a visibility determination target, the visibility determination unit 160 determines that the position of the point P projected is within the visibility determination region. When the position of the point P projected (the image coordinates (Xi,Yi) of the point P) is determined to be within the visibility determination region (YES at S553), the visibility determination unit 160 determines at S554 whether the point P is visible from the camera 100, that is, determines visibility of the point P. In the visibility determination, the visibility determination unit 160 compares a pixel value of the depth image at the image coordinates (Xi,Yi) of the point P and a value Zc of a z coordinate of the camera coordinates of the point P (a distance from the camera 100 to the point P). As this comparison result, when a difference d between the pixel value of the depth image and the value Zc is equal to or less than a threshold value, the visibility determination unit 160 determines that the point P is visible from the camera 100, and in a case where the difference d exceeds the threshold value, the visibility determination unit 160 determines that the point P is invisible from the camera 100.

In a case where the point P is determined to be visible (YES at S555), the visibility determination unit 160 sets the point P to be visible from the camera 100 (S556). Furthermore, in a case where the point P is determined to be invisible (NO at S555), the visibility determination unit 160 sets the point P to be invisible from the camera 100 (S557). Furthermore, in a case where the position of the point P projected is determined at S553 to be outside the visibility determination region (NO at S553), the point P is immediately set to be invisible from the camera 100. That is, in a case where a pixel value of the visibility determination region corresponding to the image coordinates (Xi,Yi) is 0 (in a case where the image coordinates (Xi,Yi) is not a visibility determination target), the visibility determination unit 160 sets the point P to be invisible from the camera 100 without performing the visibility determination at S554. When the above-described processing is performed for all of the cameras (S558), the visibility determination for one point P is completed. Furthermore, the above-described processing is executed for all of the points constituting the point group (S560 of FIG. 5A), and thus, visibility information of the point group is generated. When the above-described visibility determination for all of the points ends (YES at S560), the visibility determination unit 160 ends the visibility determination processing.

At S570, the video generation unit 170 generates a virtual viewpoint image, based on the camera parameter of each camera, and the foreground image (texture), the shape model (point group information), the visibility information, and information of the virtual camera. Note that the camera parameter of each camera are obtained by the information obtaining unit 120, the shape model (point group information) is generated by the shape estimation unit 130, and the visibility information is generated by the visibility determination unit 160. Furthermore, the information of the virtual camera (virtual viewpoint) may be designated by the operation unit 416 (for instance, a mouse or a joy stick) as described above, or may be determined in advance by a parameter file or the like. The virtual camera information may be obtained by any known method. At S580, the display unit 180 causes the display 415 to display the virtual viewpoint image generated by the video generation unit 170.

At S570 described above, the video generation unit 170 generates the virtual viewpoint image by generating a foreground image (image of an object region) and a background image as viewed from the virtual camera, and overlaying the foreground image and the background image that are generated. A method of generating a virtual viewpoint image by the video generation unit 170 of the present embodiment will be more specifically explained below.

First, a method of generating a foreground image for a virtual viewpoint image by the video generation unit 170 will be explained. A foreground image of a virtual viewpoint image is generated by rendering a colored point group by a known CG rendering technique. To color the point group, the video generation unit 170 first refers to the point group information and the visibility information, and obtains coordinates (Xx,Yw,Zw) of a point P to be colored, and a visibility determination result. In the visibility information, the visibility determination result is applied to each point of the point group information, and an equal identification number is applied to a point and the visibility determination result corresponding to that point. The video generation unit 170 can obtain a corresponding visibility determination result from an identification number applied to the point P. Subsequently, the video generation unit 170 refers to the visibility determination result to specify a camera from which the point P is determined to be visible. The video generation unit 170 converts the coordinates (Xx,Yw,Zw) of the point P into coordinates (Xi,Yi) of the image coordinate system of the camera specified from which the point P is determined to be visible, and a pixel value of the coordinates (Xi,Yi) on a camera image captured by that camera is set to be color of the point P.

Note that in a case where the point P is visible from a plurality of cameras, the video generation unit 170 selects a camera from which color is obtained. For a camera selection method for instance, a "resolution priority mode," an "angle priority mode," and a "no priority mode" are prepared. The mode to be used is set to the video generation unit 170 by referring to a setting file in which the mode to be used is described. The "resolution priority mode" is a mode of preferentially selecting a camera that captures an image at high resolution. For instance, a sphere having a known physical size is projected onto an image of each camera, and the number of pixels of a region of the sphere projected is calculated. In a case where the number of pixels calculated is equal to or greater than the number of pixels set in advance, the camera is determined to have high resolution, and otherwise, the camera is determined to have low resolution. Among the cameras from which the point P is determined to be visible, the camera determined to have high resolution is selected and used for coloring the point P. Note that a predetermined number (one or more) of the cameras may be selected from the cameras from which the point P is determined to be visible, in order from the cameras having higher resolution (having a larger number of pixels calculated). Furthermore, the "angle priority mode" is a mode of preferentially selecting a camera located by a shorter distance to the virtual camera. A position of each camera can be obtained from an extrinsic parameter, and a distance from the position of each camera to a position of the virtual camera is obtained. The video generation unit 170 selects a predetermined number (one or more) of the cameras from the cameras from which the point P is determined to be visible, in order from the cameras located by a smaller distance to the position of the virtual camera, and uses the cameras in coloring. In the "no priority mode," the priority order of the cameras is not set, and all of the cameras from which the point P is determined to be visible are used in coloring. In each mode, the video generation unit 170 obtains a pixel value from an image captured by the camera selected. In a case where a plurality of the cameras are selected, the video generation unit 170 determines, for instance, an average value of pixel values obtained from images captured by the plurality of cameras to be color of the point P. Note that as the average value, a simple average may be calculated, or a weighted average may be calculated by setting a weight in accordance with the priority order. Examples of the priority order include the order from the cameras having higher resolution, the order from the cameras located by a shorter distance to the point P, and the like. All of points in the image of the object observed from the virtual camera can be colored by repeating the above-described processing for all of the points of the point group.

Subsequently, a method of generating a background image of a virtual viewpoint image will be explained. First, the video generation unit 170 obtains a mesh model of a stadium or the like that becomes a background. This mesh model is generated in advance to generate virtual viewpoint video. The video generation unit 170 projects a triangle element forming the mesh model onto a captured image captured by each camera, and generates, from the captured image of a camera being orthogonal by the greatest degree and having an angle of view within which the triangle element projected falls, texture of that triangle element. The video generation unit 170 maps the texture generated as described above to each triangular element of the mesh model, and performs rendering, based on the camera parameter of the virtual camera, and thus, generates a background image of a virtual viewpoint image. The video generation unit 170 overlays the foreground image on the background image obtained as described above of a virtual viewpoint image, and thus generates the virtual viewpoint image. Note that the captured image for obtaining the texture of the background model is obtained in advance by the information obtaining unit 120 from the plurality of cameras.

As described above, according to the first embodiment, a visibility determination region can be set in accordance with a blurring state of a captured image, and visibility of each point of point group information can be determined based on this visibility determination region. Thus, a region having large blurring on the image can be made invisible, and as a consequence, a color of a pixel of a sharp region can be used as texture of a shape model, and blurring of a virtual viewpoint image is prevented or reduced.

Second Embodiment

The first embodiment describes an example of the configuration in which a visibility determination region is set on a captured image, based on contrast of captured images. A second embodiment will explain a configuration in which a visibility determination region is set in a capture area, based on a position of focus of a camera and a depth of field of the camera. More specifically, a region setting unit 150 obtains a three-dimensional region (a depth of field according to a focus position) expressed by a distance between a front depth of field and a rear depth of field of a camera. An image in a captured image of an object that is in this three-dimensional region is estimated to have small blurring (a blurring state satisfies a predetermined condition). The region setting unit 150 sets this three-dimensional region as a visibility determination region, and determines visibility for a point existing in the visibility determination region. In the second embodiment, the focus position of the camera is fixed in advance at a position at which the object is estimated to be present. Thus, the configuration is particularly useful in an image capturing environment in which movement of an object can be assumed to be small.

Configuration

A configuration of a virtual image generation system and configurations of an image capture apparatus 1 and an information processing apparatus 2, related to the second embodiment are similar to those in the first embodiment (FIGS. 1, 2A, 2B, and 4). However, in the information processing apparatus 2 of the second embodiment, operations of the region setting unit 150 and a visibility determination unit 160 are different from those in the first embodiment. The different operations from those in the first embodiment will mainly be explained below.

Operation Flow

Figure 7B:
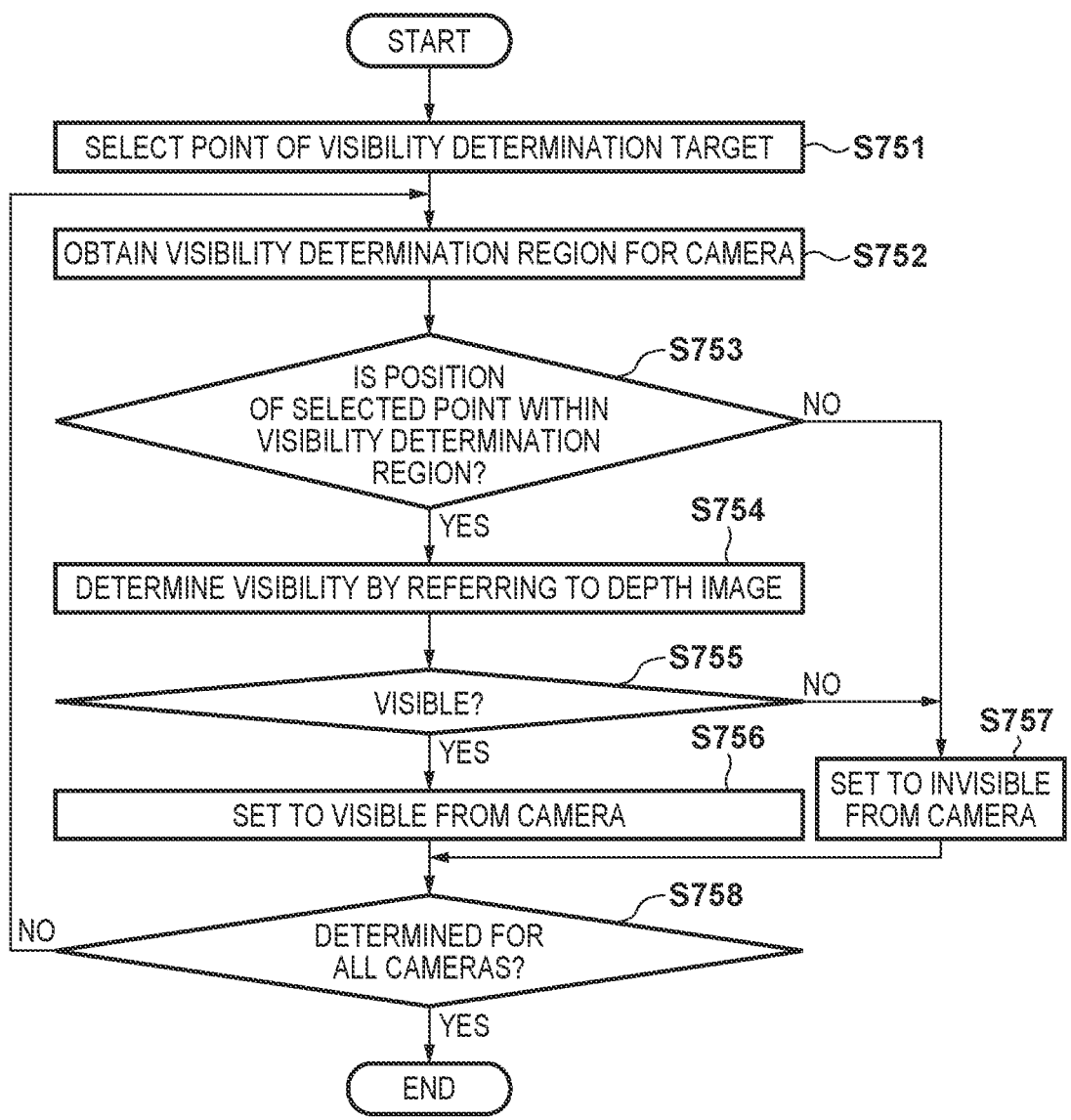
FIG. 7B is a flowchart illustrating virtual viewpoint image generation processing according to the second embodiment.

FIGS. 7A and 7B are flowcharts illustrating virtual viewpoint image generation processing according to the second embodiment. The processing of the information processing apparatus 2 in the second embodiment will be explained with reference to the flowcharts illustrated in FIGS. 7A and 7B. However, since processing at S500, S510, S520, S530, S560, S570, and S580 is similar to that in the first embodiment, detailed explanation of those steps will be omitted.

Figure 8:
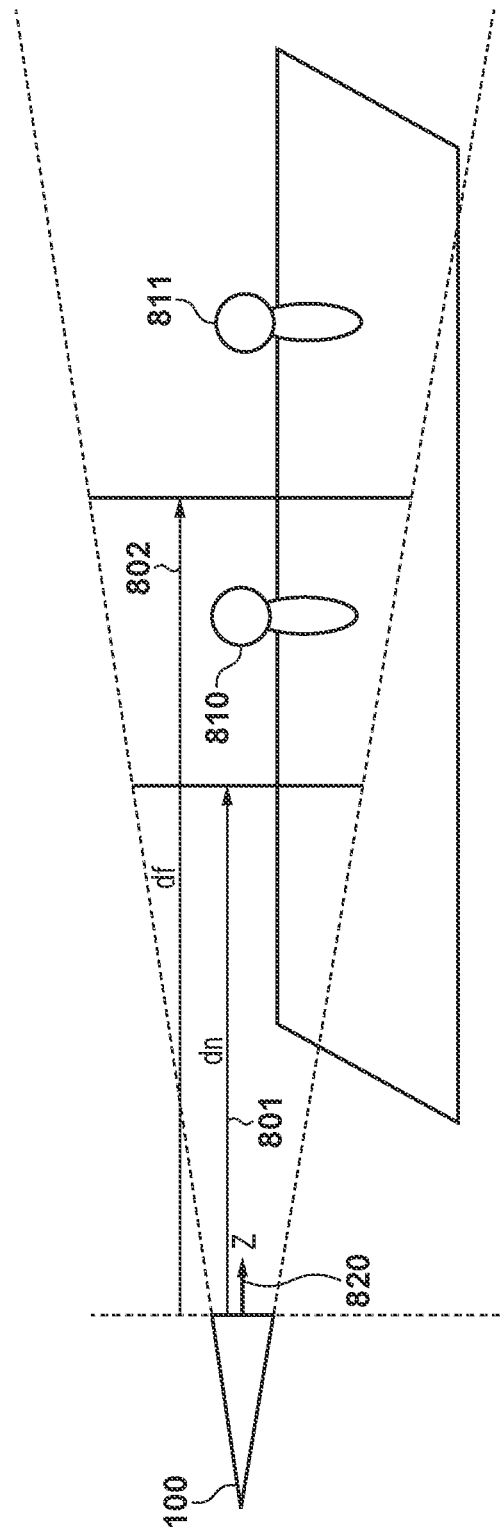
FIG. 8 is a schematic diagram explaining a visibility determination region related to the second embodiment.

At S740, the region setting unit 150 sets a visibility determination region of each camera, based on a depth of field of each camera. A visibility determination region setting method at S740 will be explained with reference to FIG. 8. FIG. 8 is a schematic diagram illustrating a camera 100 and a front depth of field 801 and a rear depth of field 802 of the camera 100. A value obtained by subtracting a distance dn of the front depth of field 801 from a distance df of the rear depth of field 802 is a depth of field of the camera 100. In a case where an image is captured by adjusting focus of the camera 100 with respect to a position of an object 810, a position of an object 811 on the captured image of the camera 100 becomes outside of the depth of field, and thus, blurring becomes large in an image of the object 811. The region setting unit 150 sets the value df of the rear depth of field 802 and the value dn of the front depth of field 801 as visibility determination regions. Note that df and dn may be calculated by using a known equation and by using a focal length, an F number of the camera 100, a distance of the camera 100 to an object, and a size of a permissible circle of confusion of the camera 100. As for the focal length and the F number, information included in a camera parameter obtained by an information obtaining unit 120 is used. The size of the permissible circle of confusion is obtained by reading information of a predetermined text file on start-up of the information processing apparatus 2. The distance to an object is obtained, for instance, by calculating a centroid position of the object 810 from point group information obtained by estimating a shape of the object 810, and calculating a distance from a position of the camera 100 to that centroid position. Note that the distance to an object may be set by inputting a value measured in advance by using a laser measurement device or the like to the apparatus in a format such as a text file.

At S750, the visibility determination unit 160 obtains a camera parameter, point group information, a depth image, and a visibility determination region (a front depth of field and a rear depth of field of each camera). Then, the visibility determination unit 160 determines visibility of each point constituting the point group information by referring to the visibility determination region. FIG. 7B is the flowchart illustrating a detail of the processing at S750. The visibility determination unit 160 first selects a point P of a visibility determination target among the points constituting the point group information (S751). Subsequently, the visibility determination unit 160 obtains a visibility determination region determined from the front depth of field and the rear depth of field of the camera 100 (S752), and determines whether a position of the point P selected is within the visibility determination region (S753).

With reference to FIG. 8, a method of determining whether the position of the point P is within the visibility determination region, by using the front depth of field and the rear depth of field of each camera will be described. A direction 820 in which the camera 100 is oriented in FIG. 8 is assumed to be an axis (Z axis) perpendicular to a camera plane. The front depth of field 801 and the rear depth of field 802 are distances in the Z-axis direction from the camera plane. The visibility determination unit 160 first converts coordinates (Xw,Yw,Zw) of the point P into coordinates in a camera coordinate system and an image coordinate system, and calculates camera coordinates (Xc,Yc,Zc) of the point P. In a case where a value (Zc) of a z coordinate in the camera coordinates calculated of the point P is larger than the front depth of field 801 and smaller than the rear depth of field 802, the visibility determination unit 160 determines that the point P is within the visibility determination region (the point P is a visibility determination target).

In a case where the position of the point P is determined to be within the visibility determination region (YES at S753), the visibility determination unit 160 projects the point P onto a captured image of the camera 100, and determine visibility by referring to the depth image (S754). This processing is similar to the processing explained at S554. The visibility determination unit 160 first converts the camera coordinates (Xc,Yc,Zc) of the point P into image coordinates (Xi,Yi). The visibility determination unit 160 compares a pixel value of the depth image at the image coordinates (Xi,Yi) of the point P and the value (Zc) of the z coordinate in the camera coordinates of the point P. As this comparison result, when a difference d between the pixel value of the depth image and the value (Zc) is equal to or less than a threshold value set in advance, the visibility determination unit 160 determines that the point P is visible from the camera 100. In a case where the difference d exceeds the threshold value, the visibility determination unit 160 determines that the point P is invisible from the camera 100.

In a case where the point P is determined to be visible (YES at S755), the visibility determination unit 160 sets the point P to be visible from the camera 100 (S756). On the other hand, in a case where the point P is determined to be invisible (NO at S755), the visibility determination unit 160 sets the point P to be invisible from the camera 100 (S757). Furthermore, in a case where the point selected is determined to be outside of the visibility determination region (NO at S753), the visibility determination unit 160 immediately sets the point P to be invisible from the camera 100 (S757). Thus, the point group of the object present outside the visibility determination region is excluded from a target of the visibility determination processing at S754, and is set to be invisible from the camera 100. The above-described processing is performed for all of the cameras (S758), and thus, whether the point P is visible or invisible from each camera is set. Further, the above-described processing is executed for all of the points of the point group information (S560 of FIG. 7A), and thus, visibility information is generated.

As described above, according to the second embodiment, a visibility determination region corresponding to a depth of field is set for each camera, and based on the visibility determination region, visibility of each point of point group information is determined. Thus, a point present in a region being out of focus of the camera and having large blurring in a captured image is set to be invisible. As a consequence, in generation of a virtual viewpoint image, color of a pixel of a region having large blurring is excluded, and color of a pixel of a region having small blurring can be used preferentially, and thus, blurring of the virtual viewpoint image can be prevented or reduced.

Third Embodiment

A third embodiment will explain a configuration in which an image capture apparatus 1 (camera 100) has a plurality of distance measurement points for focusing processing (focus adjustment), and utilizes, in visibility determination, distance measurement information at those distance measurement points. Furthermore, while the second embodiment explains the configuration in which the focus of the camera 100 is fixed, the third embodiment will explain a configuration in which a focus position follows an object and thus varies. In the third embodiment, for instance, an image is captured by adjusting focus of the camera 100 with respect to a main object for each frame, and a constant depth of field from the focus is set as a visibility determination region by referring to distance measurement information used in the focus adjustment at the time of image capturing.

Configuration

Figure 9:
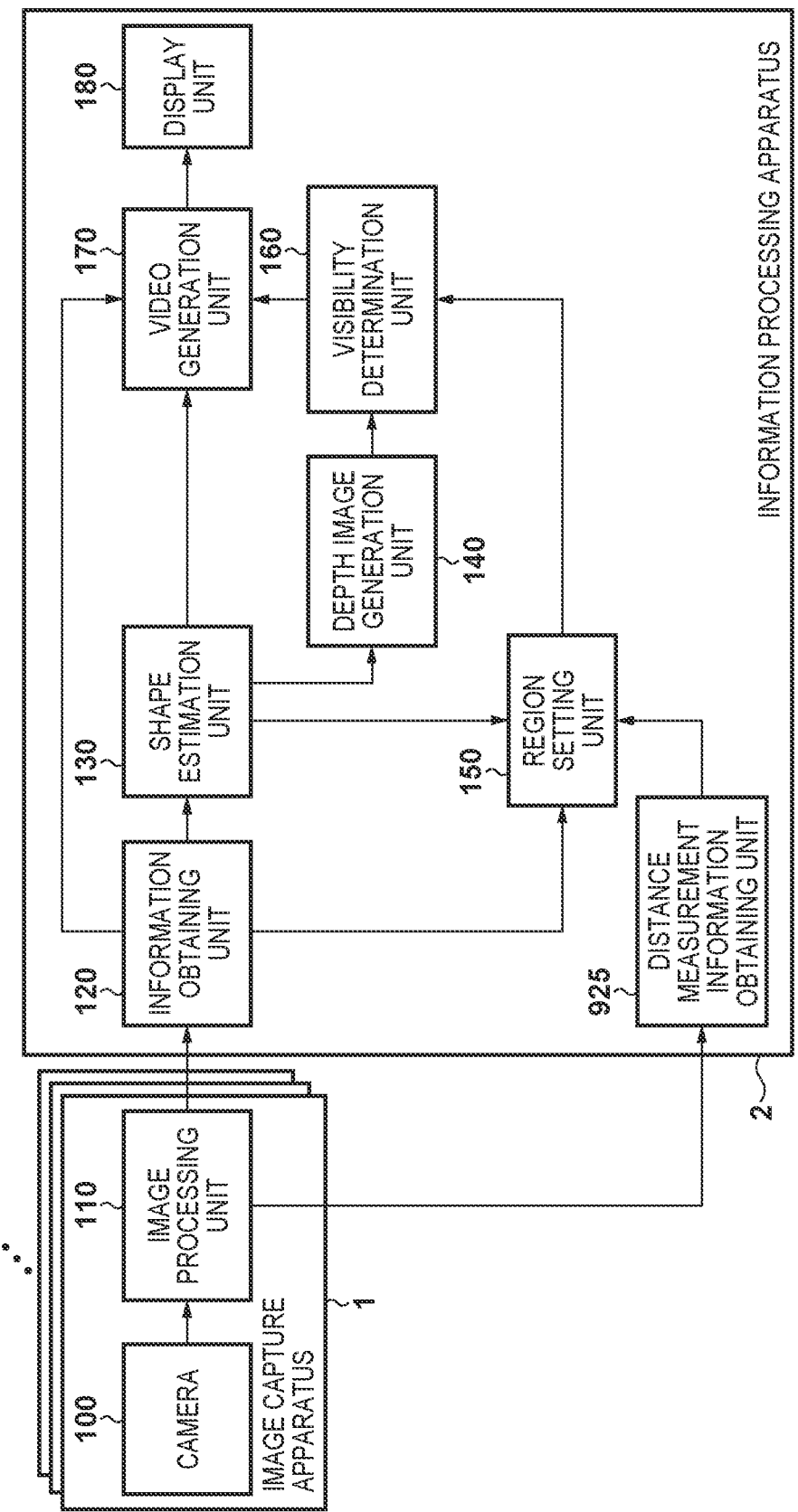
FIG. 9 is a figure illustrating a configuration example of a virtual-viewpoint image generating system according to a third embodiment.

FIG. 9 is a block diagram illustrating a configuration example of a virtual image generation system, and functional configuration examples of the image capture apparatus 1 and an information processing apparatus 2 that the virtual image generation system includes, related to the third embodiment. In the functional configuration of the information processing apparatus 2 related to the third embodiment, a distance measurement information obtaining unit 925 is added to the functional configuration of the first embodiment (FIG. 1).

An information obtaining unit 120 estimates an intrinsic parameter according to a focal length in advance before a start of image capturing, and saves information of the intrinsic parameter in a format such as a text file. A method of estimating the intrinsic parameter at each focal length is equal to that in the first embodiment. At the time of image capturing, the intrinsic parameter corresponding to the focal length is obtained for each frame.

The distance measurement information obtaining unit 925 obtains, for each frame, distance measurement information of each of a plurality of distance measurement points used in focus adjustment by the camera 100 of the image capture apparatus 1. FIG. 10 is a schematic diagram of distance measurement information obtained when an image of an object 810 is captured by the camera 100. As described below with reference to FIG. 12, the distance measurement information is represented by an image (refers to below as a distance measurement image), and a distance from a focal point 1001 (defocusing amount) is stored in each pixel of the distance measurement image. The distance represented by each pixel of the distance measurement image becomes, for instance, 0 at the focal point 1001, and increases in a positive direction as a focus position deviates to be farther from the camera, and decreases in a negative direction as the focus position deviates to be nearer the camera (definitions of the positive direction and the negative direction may be opposite). The number of the pixels of the distance measurement image may be different from the number of pixels of a captured image. Generally, the number of the pixels of the distance measurement image is less than the number of pixels of a captured image (or a depth image). The distance measurement information obtaining unit 925 obtains a parallax image (left image and right image) obtained by the camera 100 from an image processing unit 110. The distance measurement information obtaining unit 925 obtains the distance measurement information, based on the parallax image, and generates the distance measurement image. Note that a procedure of obtaining the distance measurement image is not limited to this, and for instance, the image processing unit 110 may obtain a parallax image from the camera 100 and generate the distance measurement image. In this case, the distance measurement information obtaining unit 925 obtains the distance measurement image from the image processing unit 110. Time information equal to that of a captured image is applied to the distance measurement image.

A region setting unit 150 sets, for each frame, a visibility determination region of each camera, based on the distance measurement image. The region setting unit 150 of the third embodiment sets, as the visibility determination region, a region sandwiched between a front depth of field 1002 and a rear depth of field 1003 with the focal point 1001 of the camera 100 being reference in FIG. 10. A visibility determination unit 160 generates visibility information by using a camera parameter of each camera, the distance measurement image, the visibility determination region, a depth image, point group information.

Operation Flow

Figure 11A:
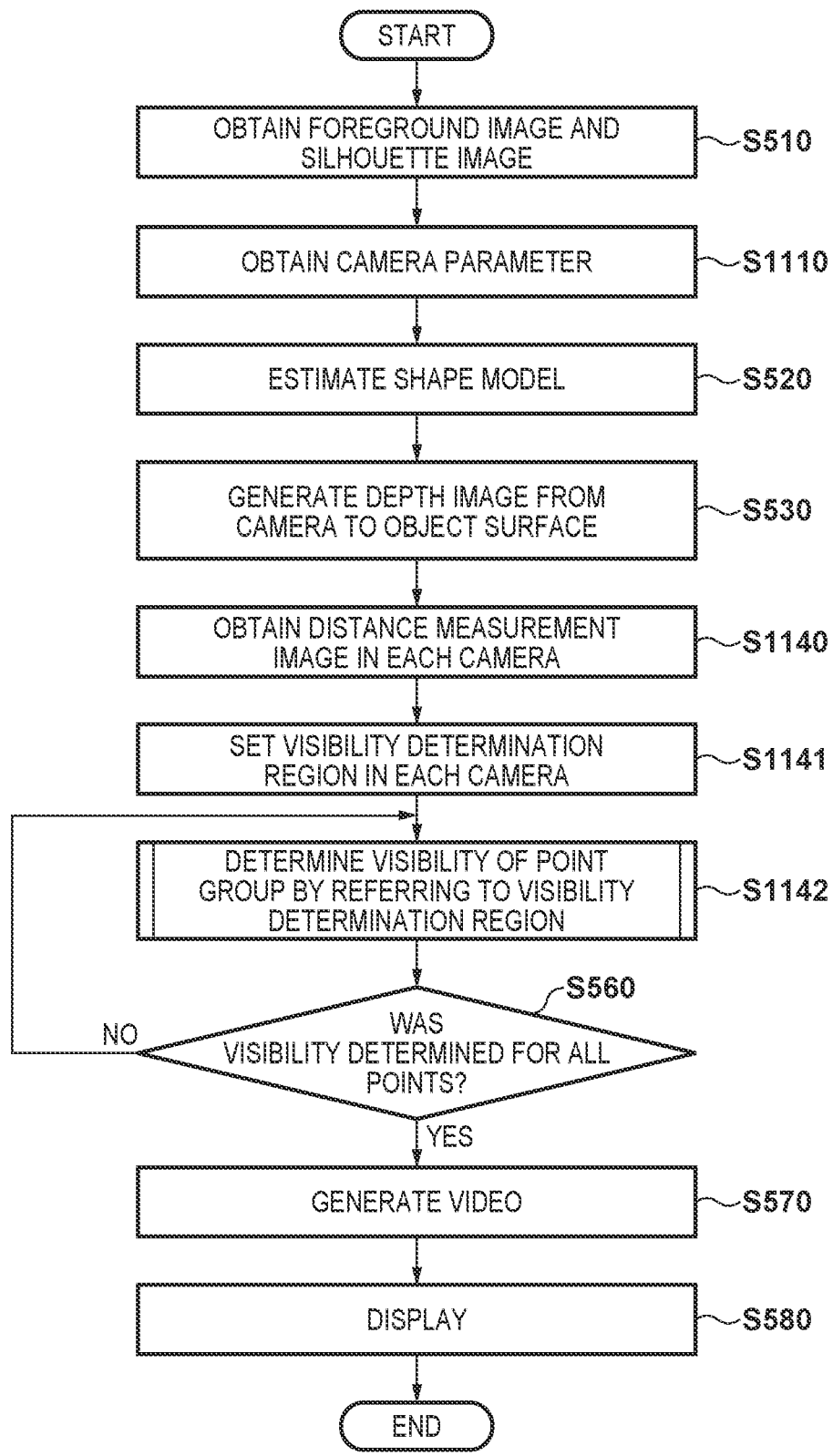
FIG. 11A is a flowchart illustrating virtual viewpoint image generation processing according to the third embodiment.
Figure 11B:
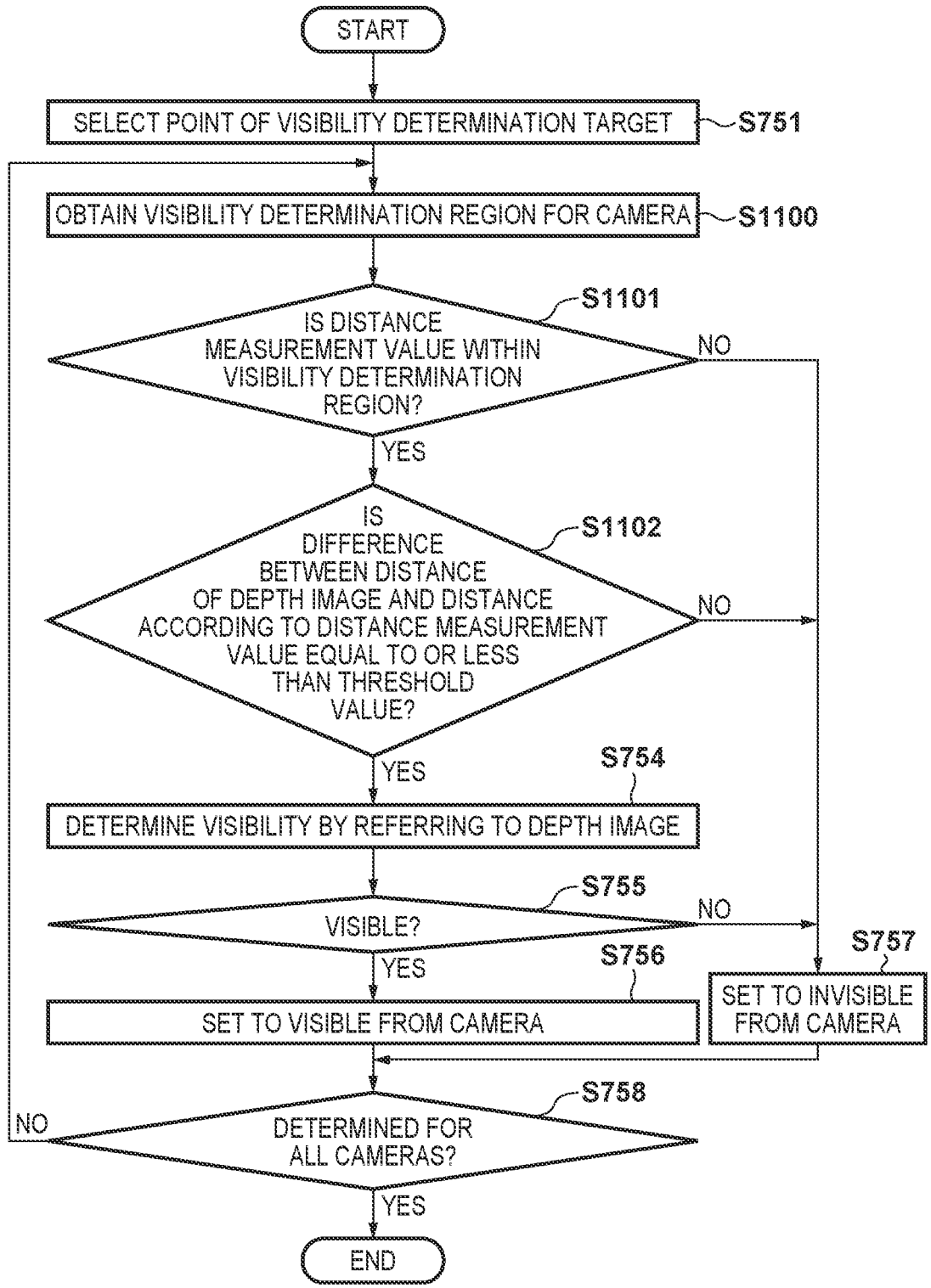
FIG. 11B is a flowchart illustrating virtual viewpoint image generation processing according to the third embodiment.

Processing of each unit of the information processing apparatus 2 in the third embodiment will be explained with reference to flowcharts illustrated in FIGS. 11A and 11B. However, since processing at S510, S520, S530, S560, S570, and S580 is similar to that in the first embodiment, detailed explanation will be omitted. S1110, S1140, S1141, and S1142 (FIG. 11B) of FIG. 11A will mainly be explained below.

At S1110, the information obtaining unit 120 obtains a camera parameter of the camera 100 from the image capture apparatus 1. The camera 100 of the image capture apparatus 1 in the third embodiment continues to adjust focus with respect to the main object 810 for each frame. In a case where a focal length varies in accordance with the focus adjustment, the image processing unit 110 selects an intrinsic parameter according to the focal length that vaned, and outputs the intrinsic parameter to the information obtaining unit 120. To make the intrinsic parameter selectable in accordance with a focal length of a lens attached to the camera 100, the intrinsic parameter according to the focal length is estimated in advance before a start of image capturing, and correspondence between the focal length and the intrinsic parameter is recorded in a text file. Then, that text file is read on start-up of the information processing apparatus 2, and the focal length and the intrinsic parameter are associated with each other and held in a memory or the like. The text file describes the intrinsic parameter for each focal length from a state in which an image of an object is taken at a wide angle (the shortest focal length of the lens) to a state in which an image of an object is taken at high resolution (the longest focal length of the lens). The range of the focal length used may be determined in advance, and information of the intrinsic parameter according to the focal length may be obtained within that range at the time of image capturing. An extrinsic parameter may be invariant, or may be estimated for each frame. In a case where a focal length used when a camera has captured an image of a frame is shorter or longer than the shortest focal length held in the memory, and thus there is no information of a relevant intrinsic parameter, that camera is controlled not to be used for generating virtual viewpoint video at capturing time of that frame.

Figure 12:
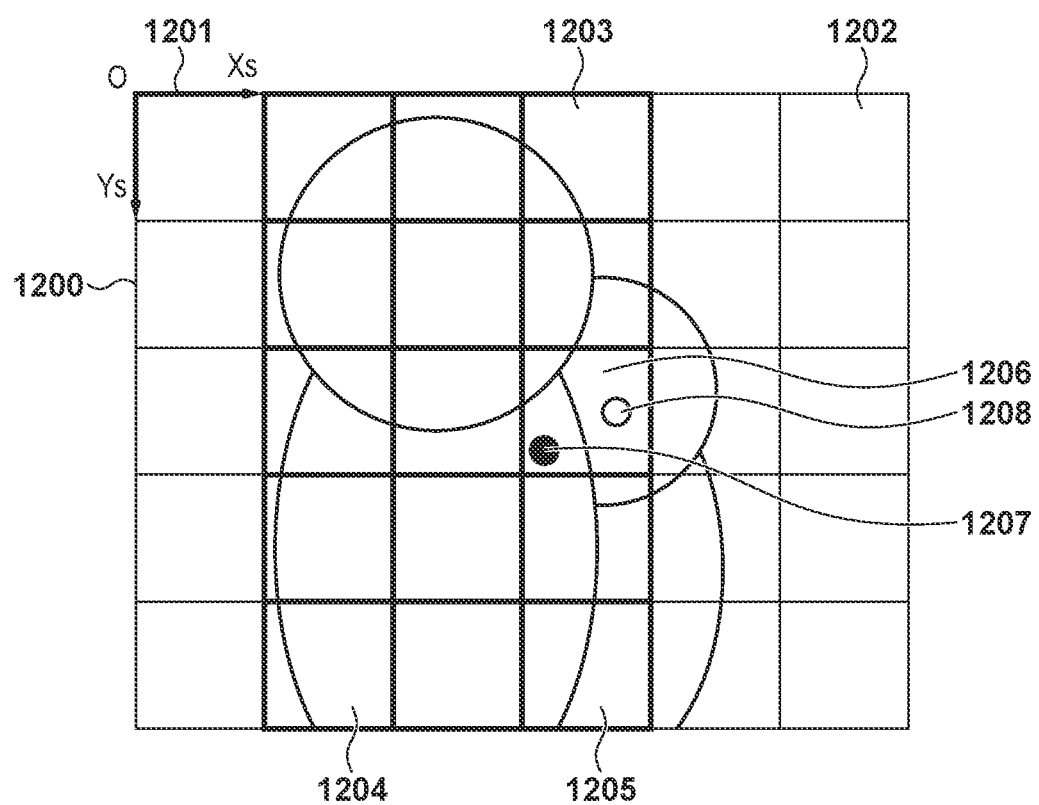
FIG. 12 is a schematic diagram explaining a visibility determination method according to the third embodiment.

At S1140, the distance measurement information obtaining unit 925 obtains, for each frame, a distance measurement image indicating distance measurement values at a plurality of distance measurement points of the camera 100, from the image capture apparatus 1. The distance measurement information obtaining unit 925 obtains distance measurement images for all of a plurality of the cameras. FIG. 12 illustrates a schematic diagram of a distance measurement image 1200 obtained by the distance measurement information obtaining unit 925. A coordinate system 1201 of the distance measurement image 1200 includes an origin O at a corner on the upper left of the image, a horizontal axis Xs, and a vertical axis Ys. As described above, a distance from a focal point is stored in each pixel as a distance measurement value. A pixel 1202 is a pixel that has a large distance from the focal point and that is out of focus, and is illustrated in FIG. 12 by a thin-line frame. Furthermore, a pixel 1203 is a pixel that has a short distance from the focal point and that is in focus, and is illustrated in FIG. 12 by a thick-line frame. An object 1204 is a main object located in the vicinity of the focal point, and an object 1205 is a non-main object that is located farther than the object 1204 and that has a focus error.

At S1141, the region setting unit 150 obtains, for each frame, the camera parameter of each camera (including the focal length and the F number) from the information obtaining unit 120, and obtains, for each frame, the distance measurement image from the distance measurement information obtaining unit 925. The region setting unit 150 sets a visibility determination region for each camera, based on those pieces of information. As with the second embodiment, the visibility determination region corresponds to a depth of field of the camera 100. In the third embodiment, the visibility determination region is expressed by a distance to a focus position and by a front depth of field and a rear depth of field with the focus position being reference. The distance to the focus position used in calculating the depth of field is obtained based on a value (distance measurement value) of a pixel having the best focus adjustment (pixel having the smallest distance measurement value) among the respective pixels of the distance measurement image, and based on a distance to an object corresponding to that pixel. The distance to an object is obtained by, for instance, a known stereoscopic principle, but is not limited to this, and may be obtained from a depth image, for instance. The region setting unit 150 calculates a front depth of field and a rear depth of field for each camera, and sets the front depth of field and the rear depth of field as a visibility determination region for each camera. The visibility determination region set for each camera by the above-described processing moves in accordance with movement of a focus position of each camera.

Subsequently, visibility from each camera of all of points constituting point group information is determined at S1142 and S560. At S1142, the visibility determination unit 160 determines visibility of each point of a point group by using the camera parameter, the point group information, the depth image, the visibility determination region, and the distance measurement image. The processing at S1142 will be explained with reference to the flowchart of FIG. 11B. Note that steps in FIG. 11B of performing similar processing to the processing of FIG. 7B are denoted by step numbers equal to those in FIG. 7B.

In preparation for the case where resolution of the distance measurement image and resolution of the captured image are different, the visibility determination unit 160 calculates magnification of the distance measurement images and magnification of the captured images in all of the cameras once on start-up of the apparatus. More specifically, the visibility determination unit 160 calculates magnification in a lateral direction from the number of pixels in the lateral direction of the distance measurement image and the number of pixels in the lateral direction of the captured image, and calculates magnification in a vertical direction from the number of pixels in the vertical direction of the distance measurement image and the number of pixels in the vertical direction of the captured image. This processing is executed once for each camera on start-up of the information processing apparatus 2, and the magnification obtained is kept such that the magnification can be used in subsequent processing. Subsequently, the visibility determination unit 160 first selects a point P of a visibility determination target among the points constituting the point group information (S751). The visibility determination unit 160 obtains a visibility determination region set for the camera 100 of a determination target from the visibility determination regions set for all of the cameras at S1141 (S1100). The visibility determination unit 160 determines based on the visibility determination region whether to execute visibility determination for the point P selected (S1101). Here, it is determined whether a distance measurement value of a pixel corresponding to a projection position of the point P in the distance measurement image of the camera 100 is within the visibility determination region.

The determination processing at S1101 will be described in detail. The visibility determination unit 160 converts coordinates (Xw,Yw,Zw) of the point P into coordinates in a camera coordinate system and an image coordinate system of each camera, and calculates camera coordinates (Xc,Yc,Zc) and image coordinates (Xi,Yi) of the point P. The visibility determination unit 160 calculates coordinates (Xd, Yd) of the point P in the distance measurement image by multiplying the image coordinates (Xi,Yi) by the above-described magnification in the lateral direction and the above-described magnification in the vertical magnification, respectively. The visibility determination unit 160 determines whether a distance between the camera 100 and the object obtained from a distance measurement value indicated by a pixel value at the coordinates (Xd,Yd) on the distance measurement image falls within the visibility determination region set by the region setting unit 150. Note that the visibility determination region is the range of a depth of field between a front depth of field and a rear depth of field as described above. In a case where a distance between the camera 100 and the object obtained from a distance measurement value at a projection position (coordinates (Xd, Yd)) of the point P on the captured image falls within the visibility determination region, a state of focus of an image at that projection position is within a tolerance for being usable as texture of a virtual viewpoint image. On the other hand, when the distance between the camera 100 and the object obtained from the distance measurement value at the projection position of the point P on the distance measurement image is outside the visibility determination region, a state of focus of an image at that projection position is outside the tolerance.

In a case where the distance between the camera 100 and the object is determined to fall within the visibility determination region (YES at S1101), the visibility determination unit 160 determines reliability of the distance obtained from the distance measurement image (that is, reliability of the determination result at S1101) (S1102). For instance, the visibility determination unit 160 determines whether a difference between distances obtained from the depth image and the distance measurement image, respectively, with respect to a projection position of the point P is equal to or less than a threshold value. When the difference is equal to or less than the threshold value, the distance obtained from the distance measurement image is determined to have reliability (YES at S1102), and when the difference is larger than the threshold value, the distance obtained from the distance measurement image is determined not to have reliability (NO at S1102). More specifically, the visibility determination unit 160 compares the distance between the camera 100 and the object obtained from the pixel value (distance measurement value) of the coordinates (Xd,Yd) on the distance measurement image and a distance indicated by a pixel value at a projection position of the point P in the depth image generated with respect to the camera 100. For instance, in the distance measurement image 1200 of FIG. 12, the range of a pixel 1206 including a boundary of object regions includes the object 1204 and the object 1205. Since resolution of the distance measurement image is coarser than resolution of the depth image, the distance of the depth image has higher reliability in the vicinity of the boundary of the object regions, such as the pixel 1206. Thus, the visibility determination unit 160 determines whether a difference between a pixel value (a distance between the camera and the object) at a position where the point P is projected onto the depth image, and the distance between the camera and the object obtained from the pixel value (distance measurement value) at the position where the point P is projected onto the distance measurement image is equal to or less than a threshold value. Thus, reliability of the determination at S1101 is checked.

For instance, in FIG. 12, a distance measurement value of the pixel 1206 in the distance measurement image 1200 corresponds to a distance of the object 1204, and a state of focus is determined to be within the tolerance. That is, regardless of whether a projection position of the point P is a point 1207 or a point 1208, the distance measurement value of the pixel 1206 is obtained, and at S1101, the distance measurement value is determined to be within the range of the visibility determination region. Here, in a case where a projection position of the point P is the point 1207, since the point 1207 is a point on the object 1204 and a distance in the depth image also represents the distance to the object 1204, a difference between the distance obtained from the distance measurement image and the distance obtained from the depth image is small. On the other hand, in a case where a projection position of the point P is the point 1208, since the point 1208 is a point on the object 1205 and a distance in the depth image represents a distance to the object 1205, a difference between the distance obtained from the distance measurement image and the distance obtained from the depth image is large. That is, it is understood that in a case where a projection position of the point P is the point 1208, the distance between the camera 100 and the object obtained from the distance measurement image has low reliability. Note that in the present embodiment, the pixel value of the distance measurement image may be parallax information, and in this case, parallax is converted into the distance between the camera and the object and then the comparison is performed. The distance between the camera and the object can be calculated by using a known stereoscopic principle and by using a focal length, a distance between sensors of a left image and a right image, and parallax.

In a case where the difference between the distance obtained by projecting the point P onto the depth image and the distance obtained by projecting the point P onto the distance measurement image is determined to be small (YES at S1102), the visibility determination unit 160 determines visibility of the point P from the camera 100 (S754). Visibility determination processing is as described above. On the other hand, in a case where the point P is determined not to be present within the visibility determination region (NO at S1101), the visibility determination unit 160 sets the point P to be invisible from the camera (S757). Alternatively, in a case where the difference between the distance obtained from the depth image and the distance obtained from the distance measurement image is determined to be larger than the threshold value (NO at S1102), the visibility determination unit 160 sets the point P to be invisible from the camera (S757). The above-described processing is performed for all of the cameras (S758), and thus, it can be determined whether the point P is visible from each camera. Further, the above-described processing is executed for all of the points of the point group (S560), visibility information is generated. When the above-described visibility determination for all of the points of the point group ends (YES at S560), the visibility determination unit 160 ends the visibility determination processing.

According to the third embodiment, focus of a camera is adjusted with respect to an object for each frame, and a visibility determination region is set by using a distance measurement image that is distance measurement information used in that focus adjustment. Thus, even in a case where a focus position of the camera changes by following movement of the object, the visibility determination region can follow this change, and a region being out of focus of the camera and having large blurring can be set to be invisible. As a consequence, even in a case where the focus position varies, in generation of a virtual viewpoint image, color of a pixel of a region having large blurring is excluded, and color of a pixel of a region having small blurring can be used preferentially, and thus, blurring of the virtual viewpoint image can be prevented or reduced. In this way, according to the third embodiment, virtual viewpoint video having less blurring of an object region in the entire virtual viewpoint image can be generated for each frame.

As described above, according to each of the above-described embodiments, a visibility determination region indicating whether to determine visibility based on a blurring state is set, and when a virtual viewpoint image is generated, obtaining color from a region being outside the visibility determination region is prevented. As a consequence, blurring of the virtual viewpoint image can be reduced.

Note that in each of the above-described embodiments, the case in which a shape model is represented by a point group is explained, but the shape model is not limited to this. The shape model may be a mesh model including a polygon as an element. In this case, for instance, the visibility determination processing explained in each of the embodiments may be performed for each vertex of the polygon, and an image of a camera from which all of the vertices are determined to be visible may be used as texture of an element of that polygon. Thus, the above-described visibility determination processing can be used in visibility determination of each of a plurality of elements (points or polygon elements) forming the shape model. Furthermore, in a case where it is determined by the processing explained in each of the above-described embodiments that a point P is invisible from all of cameras, visibility determination may be performed for a camera from which the point P is determined to be invisible based on the visibility determination region, and thus, a camera from which the point P is visible may be searched for.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-161966, filed Sep. 30, 2021, which is hereby incorporated by reference herein in its entirety.

What is claimed is:

1. An information processing apparatus for generating a virtual view point image based on a plurality of captured images captured by a plurality of image capture apparatuses, comprising:
   one or more memories storing instructions: and
   one or more processors executing the instructions to:
   estimate, based on the plurality of captured images, a three-dimensional shape of an object and generate corresponding three-dimensional shape data of the object;
   obtain information indicating a depth of field of each of the plurality of image capture apparatuses;
   perform first determination of determining a visibility determination region corresponding to each of the plurality of image capture apparatus in each of the plurality of captured images based on the information indicating a depth of field of each of the plurality of image capture apparatuses;
   perform second determination of, in a case where an element among a plurality of elements forming the three-dimensional shape data of the object is included in the visibility determination region, determining whether or not the element is visible from an image capture apparatus, and in a case where an element among the plurality of elements forming the three-dimensional shape data of the object is not included in the visibility determination region, determining that the element is not visible from an image capture apparatus; and
   generate a virtual viewpoint image, based on a determination result by the second determination, the obtained three-dimensional shape data and the plurality of captured images,
   wherein, in generating the virtual viewpoint image, for each of the plurality of elements, texture corresponding to that element of the three-dimensional shape data is generated based on a captured image obtained from an image capture apparatus from which that element is determined to be visible by the second determination.

2. The information processing apparatus according to claim 1, wherein information indicating a depth of field of each of the plurality of image capture apparatuses is according to a focus position of each of the plurality of image capture apparatuses.

3. The information processing apparatus according to claim 1, wherein the one or more processors further executes the instructions to:
   obtain a plurality of distance measurement values obtained at a plurality of distance measurement points of the image capture apparatus in focus adjustment and representing a distance from a focus position of the image capture apparatus; and
   perform third determination of determining the visibility determination region corresponding to a depth of field of the image capture apparatus in a capture area of the image capture apparatus, based on the plurality of distance measurement values.

4. The information processing apparatus according to claim 3, wherein in the third determination, the visibility determination region is determined based on a distance measurement value closest to the focus position among the plurality of distance measurement values.

5. The information processing apparatus according to claim 3, wherein the one or more processors further executes the instructions to generate a depth image representing a distance to a surface of the object represented by the three-dimensional shape data, wherein in a case where a difference between a distance measurement value corresponding to the element among the plurality of distance measurement values, and a distance represented by a pixel at a projection position of the element in the depth image is equal to or greater than a threshold value, it is determined, by the second determination, that the part in the object corresponding to the element is not captured.

6. The information processing apparatus according to claim 1, wherein the visibility determination region is a three dimensional region.

7. An information processing method for generating a virtual view point image based on a plurality of captured images captured by a plurality of image capture apparatuses, the method comprising:

estimating, based on the plurality of captured images, a three-dimensional shape of an object and generating corresponding three-dimensional shape data of the object;

obtaining information indicating a depth of field of each of the plurality of image capture apparatuses;

performing first determination of determining a visibility determination region corresponding to each of the plurality of image capture apparatus in each of the plurality of captured images based on the information indicating a depth of field of each of the plurality of image capture apparatuses;

performing second determination of, in a case where an element among a plurality of elements forming the three-dimensional shape data of the object is included in the visibility determination region, determining whether or not the element is visible from an image capture apparatus, and in a case where an element among the plurality of elements forming the three-dimensional shape data of the object is not included in the visibility determination region, determining that the element is not visible from an image capture apparatus; and generating a virtual viewpoint image, based on a determination result by the second determination, the obtained three-dimensional shape data and the plurality of captured images, wherein, in generating the virtual viewpoint image, for each of the plurality of elements, texture corresponding to that element of the three-dimensional shape data is generated based on a captured image obtained from an image capture apparatus from which that element is determined to be visible by the second determination.

8. A non-transitory computer-readable storage medium storing a program for causing a computer to execute an information processing method for generating a virtual view point image based on a plurality of captured images captured by a plurality of image capture apparatuses, the method comprising:

estimating, based on the plurality of captured images, a three-dimensional shape of an object and generate corresponding three-dimensional shape data of the object;

obtaining information indicating a depth of field of each of the plurality of image capture apparatuses;

performing first determination of determining a visibility determination region corresponding to each of the plurality of image capture apparatus in each of the plurality of captured images based on the information indicating a depth of field of each of the plurality of image capture apparatuses;

performing second determination of, in a case where an element among a plurality of elements forming the three-dimensional shape data of the object is included in the visibility determination region, determining whether or not the element is visible from an image capture apparatus, and in a case where an element among the plurality of elements forming the three-dimensional shape data of the object is not included in the visibility determination region, determining that the element is not visible from an image capture apparatus; and generating a virtual viewpoint image, based on a determination result by the second determination, the obtained three-dimensional shape data and the plurality of captured images, wherein, in generating the virtual viewpoint image, for each of the plurality of elements, texture corresponding to that element of the three-dimensional shape data is generated based on a captured image obtained from an image capture apparatus from which that element is determined to be visible by the second determination.

* * * * *